United States Patent
Toda et al.

(10) Patent No.: US 6,343,221 B1
(45) Date of Patent: Jan. 29, 2002

(54) DIGITAL PORTABLE TELEPHONE DEVICE

(75) Inventors: Yoshifumi Toda; Youji Suzuki, both of Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/987,955

(22) Filed: Dec. 10, 1997

(30) Foreign Application Priority Data

Dec. 10, 1996 (JP) ............................................. 8-329582

(51) Int. Cl.[7] .................................................. H04B 1/38
(52) U.S. Cl. ................... 455/553; 455/168.1; 455/188.1
(58) Field of Search ............................... 455/552, 553, 455/101, 112, 119, 76, 260, 262, 188.1, 188.2

(56) References Cited

U.S. PATENT DOCUMENTS

| | | | | |
|---|---|---|---|---|
| 3,805,192 A | * | 4/1974 | Ocnaschek | 332/16 R |
| 5,228,074 A | * | 7/1993 | Mizikovsky | 379/59 |
| 5,410,747 A | * | 4/1995 | Ohmagari | 455/118 |
| 5,535,247 A | * | 7/1996 | Gailus | 375/297 |
| 5,610,559 A | * | 3/1997 | Dent | 331/2 |
| 5,732,330 A | * | 3/1998 | Anderson | 455/76 |
| 5,740,521 A | * | 4/1998 | Hulkko | 455/76 |
| 5,771,442 A | * | 6/1998 | Wang | 455/93 |
| 5,960,335 A | * | 9/1999 | Umemoto | 455/226.2 |

* cited by examiner

*Primary Examiner*—Daniel Hunter
*Assistant Examiner*—Nick Corsaro
(74) *Attorney, Agent, or Firm*—Rosenman & Colin LLP

(57) ABSTRACT

A digital portable telephone device includes a receiver section which receives a signal within one of an analog receiving frequency band and a digital receiving frequency band. A received signal is converted into one of a digital-band first intermediate-frequency signal and an analog-band first intermediate-frequency signal by using a first local signal. A transmitter section transmits a signal within one of an analog transmitting frequency band and a digital transmitting frequency band, wherein a modulation signal is generated by using the first local signal. A radio-frequency local signal generating section generates the first local signal within one of a digital local signal frequency band and an analog local signal frequency band, and supplies the first local signal to one of the receiver section and the transmitter section.

13 Claims, 14 Drawing Sheets

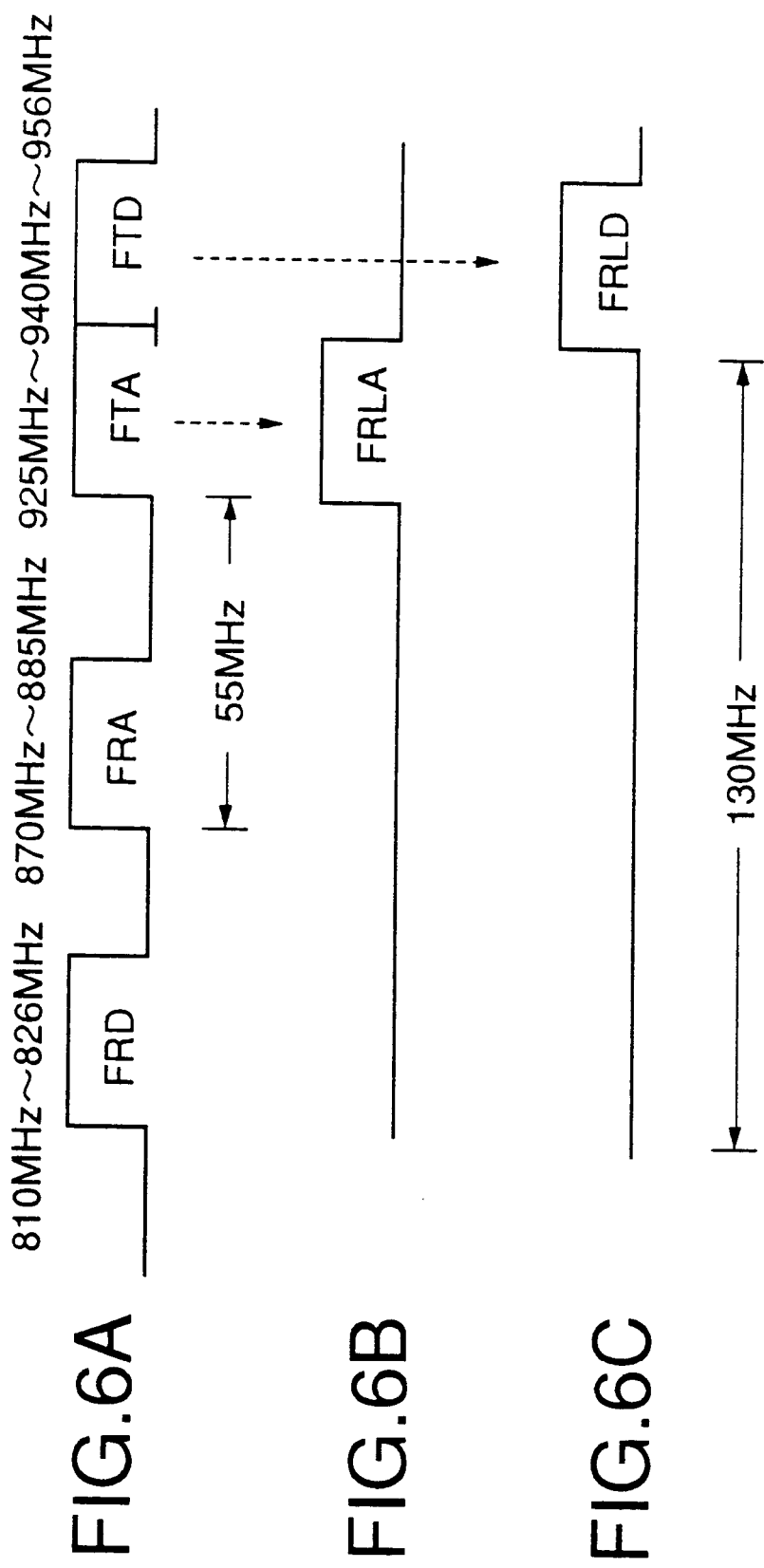

DIGITAL PORTABLE TELEPHONE DEVICE

BACKGROUND OF THE INVENTION (1) Field of the Invention

The present invention relates to digital portable telephone devices in which frequency-division multiple access (FDMA) is carried out by using a signal within either one of an analog frequency band and a digital frequency band.

Marketing of digital portable telephones by new business ventures in Japan has started in April 1995, and low-cost digital portable telephones have come to be available to the users. The number of digital portable telephone subscribers is remarkably increasing.

Because of the rapid growth in demand for portable telephone services, the available transmission capacity in some areas is frequently saturated, eroding customer satisfaction. Currently, there is a need for increasing the capacity of the available channels in order to reduce the occurrences of busy conditions in transmission lines.

As one of the measures for satisfying the need, introduction of a dual-rate standard, in addition to the existing full-rate standard, started in December 1995. When a dual-rate system is placed in operation, switched operations of a full-rate codec and a half-rate codec are performed.

A further increase in the number of portable telephone subscribers in the future is expected. New digital portable telephone systems which enable the capacity of the available channels to be increased by allocating the frequency bands for the existing analog systems to the frequency bands for the digital systems will be introduced to practical use.

(2) Description of the Related Art

FIG. 1A shows analog receiving/transmitting frequency bands used by existing digital portable telephone devices, and FIG. 1B shows digital receiving/transmitting frequency bands used by the existing digital band portable telephone devices.

As shown in FIG. 1A, the existing digital portable telephone devices use receiving frequencies of 870 MHz–885 MHz (which will be called analog receiving frequencies) and transmitting frequencies of 925 MHz–940 MHz (which will be called analog transmitting frequencies). The difference between the receiving frequencies and the transmitting frequencies for the existing digital portable telephone devices is about 55 MHz.

As shown in FIG. 1B, the existing digital portable telephone devices use receiving frequencies of 810 MHz–826 MHz (which will be called digital receiving frequencies) and transmitting frequencies of 940 MHz–956 MHz (which will be called digital transmitting frequencies). The difference between the receiving frequencies and the transmitting frequencies for the existing digital portable telephone devices is about 130 MHz.

FIG. 2 shows a basic configuration of a conventional digital portable telephone device which uses both the analog and the digital frequency bands. As shown in FIG. 2, the conventional digital portable telephone device generally has a receiver section and a transmitter section.

The receiver section comprises a receiving antenna (ANT0), a switch (SW1), a switch (SW3), a digital-band radio-frequency receiver (RX1) unit 12, an analog-band radio-frequency receiver (RX2) unit 14, a switch (SW5), an intermediate-frequency (IF) unit 16, and a demodulator (DEM) unit 18. The switch SW1 is provided to select a diversity mode in which a switching between the receiving antenna ANT0 and a transmitting antenna (ANT1) is performed. The switch SW3 is provided to select one of an input of the RX1 unit 12 and an input of the RX2 unit 14 for the receiver section. The switch SW5 is provided to connect one of an output of the RX1 unit 12 and the RX2 unit 14 to an input of the IF unit 16.

In order to cover the analog and digital receiving bands, the digital-band RX1 unit 12 and the analog-band RX2 unit 14 are separately provided in the receiver section, and the IF unit 16 is provided in common for the RX1 unit 12 and the RX2 unit 14.

In the conventional digital portable telephone device of FIG. 2, a control unit, including a time division multiple access (TDMA) unit 20, a coder/decoder (CODEC) unit 22 and an audio-frequency amplifier (AUDIO) unit 24, is provided in common for the receiver section and the transmitter section. An input/output interface (I/O) unit 34 is connected to the TDMA unit 20, the CODEC unit 22 and the AUDIO unit 24 in the control unit. Further, in the control unit, a central processing unit (CPU) 30 and memory devices 32 (ROM, RAM) are provided. A speaker (SPK) 26 is connected to the AUDIO unit 24 and constitutes an element of the receiver section. A microphone (MIC) 28 is connected to the AUDIO unit 24 and constitutes an element of the transmitter section.

Further, the transmitter section of the conventional digital portable telephone device comprises a transmitting antenna (ANT1), a switch (SW2), a switch (SW4), a radio-frequency modulator (RF MOD1) unit 38, a digital-band transmitter (PA1) unit 40, a radio-frequency modulator (RF MOD2) unit 42, an analog-band transmitter (PA2) unit 44, and a base-band modulator (MOD BB) unit 36. The switch SW2 is provided to select one of the receiver section and the transmitter section. The switch SW4 is provided to connect one of an output of the PA1 unit 40 and an output of the PA2 unit 44 to the transmitting antenna ANT1.

In order to cover the analog and digital transmitting bands, the digital-band PA1 unit 40 (including the RF MOD1 unit 38) and the analog-band PA2 unit 44 (including the RF MOD2 unit 42) are separately provided in the transmitter section, and the MOD BB unit 36 is provided in common for the PA1 unit 40 and the PA2 unit 44.

In the conventional digital portable telephone device of FIG. 2, a voice signal received at the receiving antenna "ANT0" is delivered to either one of the digital-band RX1 unit 12 and the analog-band RX2 unit 14 via the switches SW1 and SW3. The signal from one of the RX1 unit 12 and the RX2 unit 14 is delivered to the TDMA unit 20 through the switch SW5, the IF unit 16 and the DEM unit 18.

The TDMA unit 20 generates a reproduction signal by using a demodulated signal from the DEM unit 18, and separates a demultiplexed signal from the reproduction signal. The CODEC unit 22 converts the demultiplexed signal from the TDMA unit 20 into a decoded signal. The decoded signal from the CODEC unit 22 is amplified by the AUDIO unit 24. The speaker 26 is driven in accordance with the amplified signal from the AUDIO unit 24.

On the other hand, a voice signal supplied from the microphone 28 is processed in a reverse manner. A digital signal processed by the TDMA unit 20 in response to the voice signal is sent to the MOD BB 36. A modulated signal from the MOD BB unit 36 is passed through one of the digital-band transmitter (the RF MOD1 unit 38 and the PA1 unit 40) and the analog-band transmitter (the RF MOD2 unit 42 and the PA2 unit 44 ). A transmitting signal from one of the digital-band transmitter and the analog-band transmitter is sent to the transmitting antenna ANT1 via the switches SW4 and SW2. This signal is transmitted from the transmitting antenna ANT1.

Next, FIG. 3 shows a detailed structure of the conventional digital portable telephone device. A description will now be given of an operation of the receiver section of the conventional digital portable telephone device with reference to FIG. 3.

As shown in FIG. 3, in the conventional digital portable telephone device, a switch SW61 is provided to select the diversity mode, a switch SW62 is provided to select one of the receiver section and the transmitter section, a switch SW63 is provided to select one of the digital-band receiver and the analog-band receiver, and a switch SW64 is provided to connect one of the digital-band transmitter and the analog-band transmitter to the transmitting antenna ANT1.

When a radio-frequency signal within the digital receiving frequencies of 810 MHz–826 MHz is received at the receiving antenna ANT0, the received signal is sent to a band-pass filter (BPF) 601 via the switches SW61 and SW63. The signal passed through the BPF 601 is amplified by a low-noise amplifier (LNA) 602 and it is passed through a band-pass filter (BPF) 603. The radio-frequency signal passed through the BPF 603 is sent to a first input of a first mixer (MIX) 604.

In the conventional digital portable telephone device, a digital-band local signal generating section and an analog-band local signal generating section are provided (which will be described later). The digital-band local signal generating section supplies a first local signal (940 MHz–956 MHz) to a second input of the first mixer 604 via a hybrid (H) unit 622. The signal at the first input of the first mixer 604 is converted into a first intermediate-frequency signal (130 MHz) by using the first local signal, and the first intermediate-frequency signal is delivered to a first input of a second mixer (MIX2) 606 via a band-pass filter (BPF) 605.

The digital-band local signal generating section supplies also a second local signal (129.55 MHz) to a second input of the second mixer 606 in the digital-band receiver section. The first intermediate-frequency signal at the first input of the second mixer 606 is converted into a second intermediate-frequency signal (450 kHz) by using the second local signal. The second intermediate-frequency signal is delivered to an intermediate-frequency amplifier (IF AMP) 608 via a switch SW65 and a band-pass filter (BPF) 607. The amplified signal (IF) from the IF AMP 608 is sent to the control unit. The IF AMP 608 sends also a reception-level signal (RSSI) to the control unit.

On the other hand, when a radio-frequency signal within the analog receiving band of 870 MHz–885 MHz is received at the receiving antenna ANT0, the received signal is passed through the switches SW61 and SW63 and it is sent to a band-pass filter (BPF) 609. The radio-frequency signal passed through the BPF 609 is amplified by a low-noise amplifier (LNA) 610 and it is passed through a band-pass filter (BPF) 611. The radio-frequency signal passed through the BPF 611 is sent to a first input of a first mixer (MIX) 612.

The analog-band local signal generating section supplies a first local signal (925 MHz–940 MHz) to a second input of the first mixer 612 via a hybrid (H) unit 632. The signal at the first input of the first mixer 612 is converted into a first intermediate-frequency signal (55 MHz) by using the first local signal, and the first intermediate-frequency signal is delivered to a first input of a second mixer (MIX2) 614 through a band-pass filter (BPF) 613.

The analog-band local signal generating section supplies also a second local signal (54.55 MHz) to a second input of the second mixer 614. The first intermediate-frequency signal at the first input of the second mixer 614 is converted into a second intermediate-frequency signal (450 kHz) by using the second local signal. The second intermediate-frequency signal is delivered to the intermediate-frequency amplifier (IF AMP) 608 via the switch SW65 and the band-pass filter 607. The amplified signal (IF) from the IF AMP 608 is sent to the control unit.

As described above, in the conventional digital portable telephone device, the digital-band local signal generating section includes a phase-locked loop (PLL) 619, a low-pass filter (LPF) 620, and a voltage-controlled oscillator (VCO) 621. These elements generate the digital-band first local signal (940 MHz–956 MHz) by using an output signal of a reference oscillator (TCX0) 618. The reference oscillator 618 is connected to the PLL 619. The first local signal is supplied from the hybrid unit 622 to either the first mixer 604 in the digital-band receiver section or a radio-frequency modulator (RF MOD) unit 637 in the digital-band transmitter section.

The digital-band local signal generating section further includes a phase-locked loop (PLL) 623, a low-pass filter (LPF) 624, and a voltage-controlled oscillator (VCO) 625. These elements generate the digital-band second local signal (129.55 MHz) by using the output signal of the reference oscillator 618. This second local signal is supplied to the second mixer 606 in the digital-band receiver section.

The analog-band local signal generating section includes a phase-locked loop (PLL) 629, a low-pass filter (LPF) 630, and a voltage-controlled oscillator (VCO) 631. These elements generate the analog-band first local signal (925 MHz–940 MHz) by using the output signal of the reference oscillator 618. The first local signal is supplied from the hybrid unit 632 to either the first mixer 612 in the analog-band receiver section or a radio-frequency modulator (RF MOD) unit 644 in the analog-band transmitter section.

The analog-band local signal generating section further includes a phase-locked loop (PLL) 633, a low-pass filter (LPF) 634, and a voltage-controlled oscillator (VCO) 635. These elements generate the analog-band second local signal (54.55 MHz) by using the output signal of the reference oscillator 618. The second local signal is supplied to the second mixer 614 in the analog-band receiver section.

Next, a description will be given of an operation of the transmitter section of the conventional digital portable telephone device with reference to FIG. 3.

The first local signal (940 MHz–956 MHz) from the digital-band local signal generating section is supplied from the hybrid unit 622 to the RF MOD unit 637 in the digital-band transmitter section. The RF MOD unit 637 generates a π/4-shifted QPSK modulation signal by using the first local signal, and this modulation signal is passed through a band-pass filter (BPF) 638, a driver circuit (PA DRV) 639, a power amplifier (PA) 640, a coupler (CP) 641, an isolator (ISO) 642, and a low-pass filter (LPF) 651. The amplified signal passed through the LPF 651 is supplied to the transmitting antenna ANT1 via the switches SW64 and SW62, and it is transmitted from the transmitting antenna ANT1.

Control of transmission power related to the digital-band transmitter section is carried out by the driver circuit 639, the power amplifier 640, the coupler 641, a power amplifier controller (PA CONT) 643, and the control unit.

The second local signal (925 MHz–940 MHz) from the analog-band local signal generating section is supplied from the hybrid unit 632 to the RF MOD unit 644 in the analog-band transmitter section. The RF MOD unit 644 generates a π/4-shifted QPSK modulation signal from the second local signal, and this modulation signal is passed through a band-pass filter (BPF) 645, a driver circuit (PA DRV) 646, a power amplifier (PA) 647, a coupler (CP) 649, an isolator (ISO) 650, and a low-pass filter (LPF) 652. The amplified signal passed through the LPF 652 is supplied to the transmitting antenna ANT1 via the switches SW64 and SW62, and it is transmitted.

Control of transmission power related to the analog-band transmitter section is carried out by the driver circuit 646, the power amplifier 647, the coupler 649, a power amplifier controller (PA CONT) 648, and the control unit.

As shown in FIG. 3, a flash read-only memory (FLASH ROM) is connected to the control unit. In the flash read-only memory, program code instructions for the CPU to execute a call processing procedure, a digital/analog frequency band switching procedure, and other procedures, are stored.

FIG. 4 shows a local signal generating section in the conventional digital portable telephone device. FIG. 5 shows a phase-locked loop in the local signal generating section of FIG. 4.

Next, a description will be given of an operation of the local signal generating section with reference to FIG. 4 and FIG. 5.

In the conventional digital portable telephone device, the digital-band local signal generating section and the analog-band local signal generating section generate the second local signal (129.55 MHz) and the second local signal (54.55 MHz) in the same manner. For this reason, only a phase-locked loop in the analog-band local signal generating section is shown in FIG. 5.

In the phase-locked loop (PLL) of FIG. 5, a first frequency divider (1/N1), a phase comparator (PD) and a second frequency divider (1/N2) are connected as shown. A frequency divider setting signal is externally supplied to the first frequency divider (1/N1) and the second frequency divider (1/N2). A frequency division number N1 for the first frequency divider (1/N1) is set at 256. A frequency division number N2 for the second frequency divider (1/N2) is set at 2591 when the output frequency of the PLL is 129.55 MHz. When the output frequency of the PLL is 54.55 MHz, the frequency division number N2 is set at 1091.

As shown in FIG. 5, an output signal (12.8 MHz) of the reference oscillator (TCX0) 618 is converted into a reference signal (50 kHz) by the first frequency divider (1/N1) where N1=256. The reference signal (50 kHz) from the first frequency divider (1/N1) is supplied to a first input of the phase comparator (PD).

A signal (54.55 MHz) at an output of a voltage-controlled oscillator (VC02) is converted into a signal (50 kHz) by the second frequency divider (1/N2) where N2=1091. The signal (50 kHz) output from the second frequency divider (1/N2) is supplied to a second input of the phase comparator (PD). The phase comparator (PD) performs a frequency comparison between the reference signal at the first input and the signal at the second input, and outputs a signal indicating the difference in frequency between the output signal of the first frequency divider (1/N1) and the output signal of the second frequency divider (1/N2). The resulting signal from the phase comparator (PD) is passed through a low-pass filter (LPF2) and it is supplied to the voltage-controlled oscillator (VC02). Therefore, an oscillation frequency at the output of the voltage-controlled oscillator (VC02) is controlled so as to minimize the frequency difference indicated by the output signal of the phase comparator (PD).

In the local signal generating section of FIG. 4, a duplicate structure of digital-band and analog-band phase-locked loops (PLL1, PLL2) as in the phase-locked loop of FIG. 5 is connected as shown. A digital/analog band switching signal is externally supplied to each of a switch SW67, the phase-locked loop PLL1 and the phase-locked loop PLL2. The switch SW67 is actuated in response to the digital/analog band switching signal, so as to select one of the output signal (129.55 MHz) of the voltage-controlled oscillator (VC01) and the output signal (54.55 MHz) of the voltage-controlled oscillator (VC02). Therefore, the local signal generating section generates the second local signal in synchronism with the output of the reference oscillator 618.

As described above, to cover the analog receiving/transmitting frequency bands and the digital receiving/transmitting frequency bands, it is necessary for the conventional digital portable telephone device to have a duplicate structure of digital-band and analog-band transmitter circuits, a duplicate structure of digital-band and analog-band receiver circuits, and a duplicate structure of digital-band and analog-band local signal generating sections. The conventional digital portable telephone device has to have a complicated configuration and a bulky size, and it is difficult to reduce the cost while the limited frequency bands are covered.

SUMMARY OF THE INVENTION

An object of the present invention is to provide an improved digital portable telephone device in which the above-mentioned problems are eliminated.

Another object of the present invention is to provide a digital portable telephone device which provides a simple configuration capable of covering the analog and digital transmitting/receiving bands and avoiding a redundant structure having the digital-band and analog-band transmitter sections, receiver sections and local signal generating sections as in the conventional device.

The above-mentioned objects of the present invention are achieved by a digital portable telephone device comprising: a receiver section which receives a signal within either one of an analog receiving frequency band and a digital receiving frequency band, wherein a received signal is converted into one of a digital-band first intermediate-frequency signal and an analog-band first intermediate-frequency signal by using a first local signal; a transmitter section which transmits a signal within either one of an analog transmitting frequency band and a digital transmitting frequency band, wherein a modulation signal is generated by using the first local signal; and a radio-frequency local signal generating section which generates the first local signal within either one of a digital local signal frequency band and an analog local signal frequency band, and supplies the first local signal to either one of the receiver section and the transmitter section.

The above-mentioned objects of the present invention are achieved by a digital portable telephone device comprising: a receiver section which receives a signal within one of an analog receiving frequency band and a digital receiving frequency band, wherein a received signal is converted into a first intermediate-frequency signal that is common for both the analog receiving frequency band and the digital receiving frequency band, by using a first local signal; a transmitter section which transmits a signal within one of an analog transmitting frequency band and a digital transmitting frequency band, wherein a modulation signal is generated by using the first local signal; and a radio-frequency local signal generating section which generates the first local signal within one of a digital local signal frequency band and an analog local signal frequency band, and supplies the first local signal to one of the receiver section and the transmitter section, wherein a frequency of the first local signal within each of the digital local signal frequency band and the analog local signal frequency band is directly produced from oscillation frequencies of less than three voltage-controlled oscillators.

The above-mentioned objects of the present invention are achieved by a digital portable telephone device comprising: a receiver section which receives a signal within one of an analog receiving frequency band and a digital receiving frequency band, wherein a received signal is converted into a first intermediate-frequency signal that is common for both the analog receiving frequency band and the digital receiving frequency band, by using a first local signal; a transmitter section which transmits a signal within one of an analog transmitting frequency band and a digital transmitting frequency band, wherein a modulation signal is generated by using the first local signal; and a radio-frequency local signal generating section which generates the first local signal within one of a digital local signal frequency band and an analog local signal frequency band, and supplies the first local signal to one of the receiver section and the transmitter section, wherein a frequency of the first local signal within each of the digital local signal frequency band and the analog local signal frequency band is produced from oscillation frequencies of less than four voltage-controlled oscillators by using a heterodyne method.

The digital portable telephone device of the present invention is effective in providing a simple configuration for each of the transmitter section, the receiver section and the local signal generating section while covering the analog and digital transmitting/receiving bands. It is possible for the digital portable telephone device of the present invention to avoid a redundant structure having the digital-band and analog-band transmitter sections, receiver sections and local signal generating sections as in the conventional device but to achieve the same functions as the conventional device at low cost.

BRIEF DESCRIPTION OF THE DRAWINGS

The above and other objects, features and advantages of the present invention will become more apparent from the following detailed description when read in conjunction with the accompanying drawings in which:

FIG. 6A through FIG. 6C are diagrams for explaining a local frequency selection method used by the present invention;

DESCRIPTION OF THE PREFERRED EMBODIMENTS

A description will now be given of the preferred embodiments of the present invention with reference to the accompanying drawings.

Figures 1A, 1B:
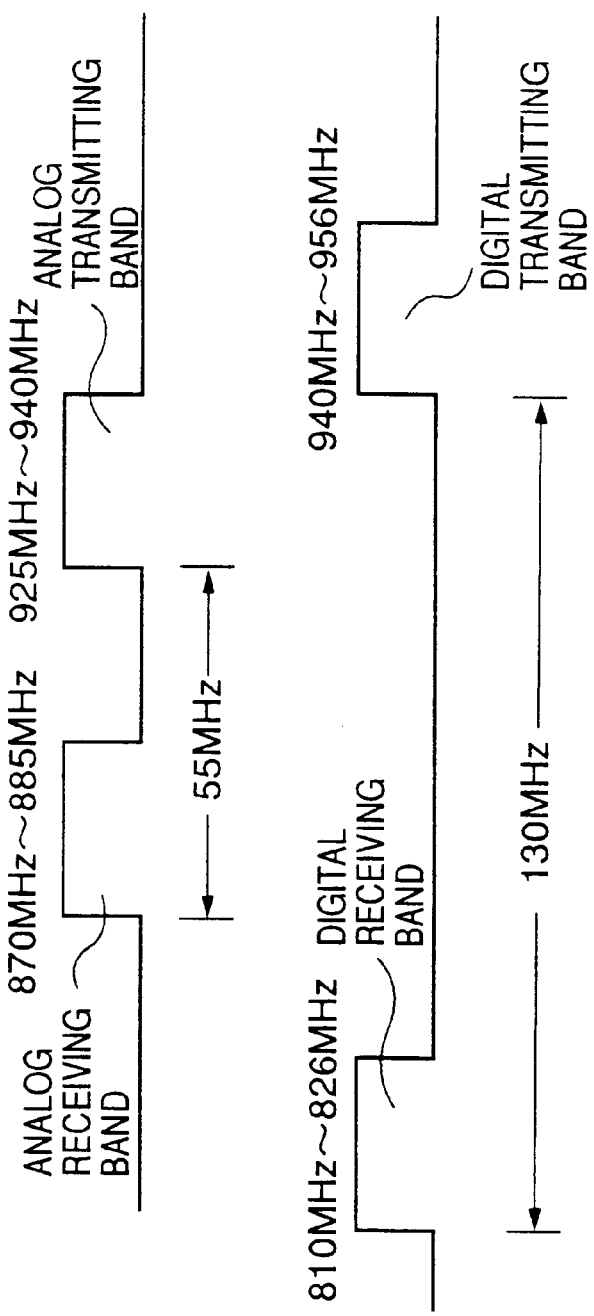
FIG. 1A and FIG. 1B are diagrams of analog and digital frequency bands used by existing digital portable telephone devices.
Figure 2:
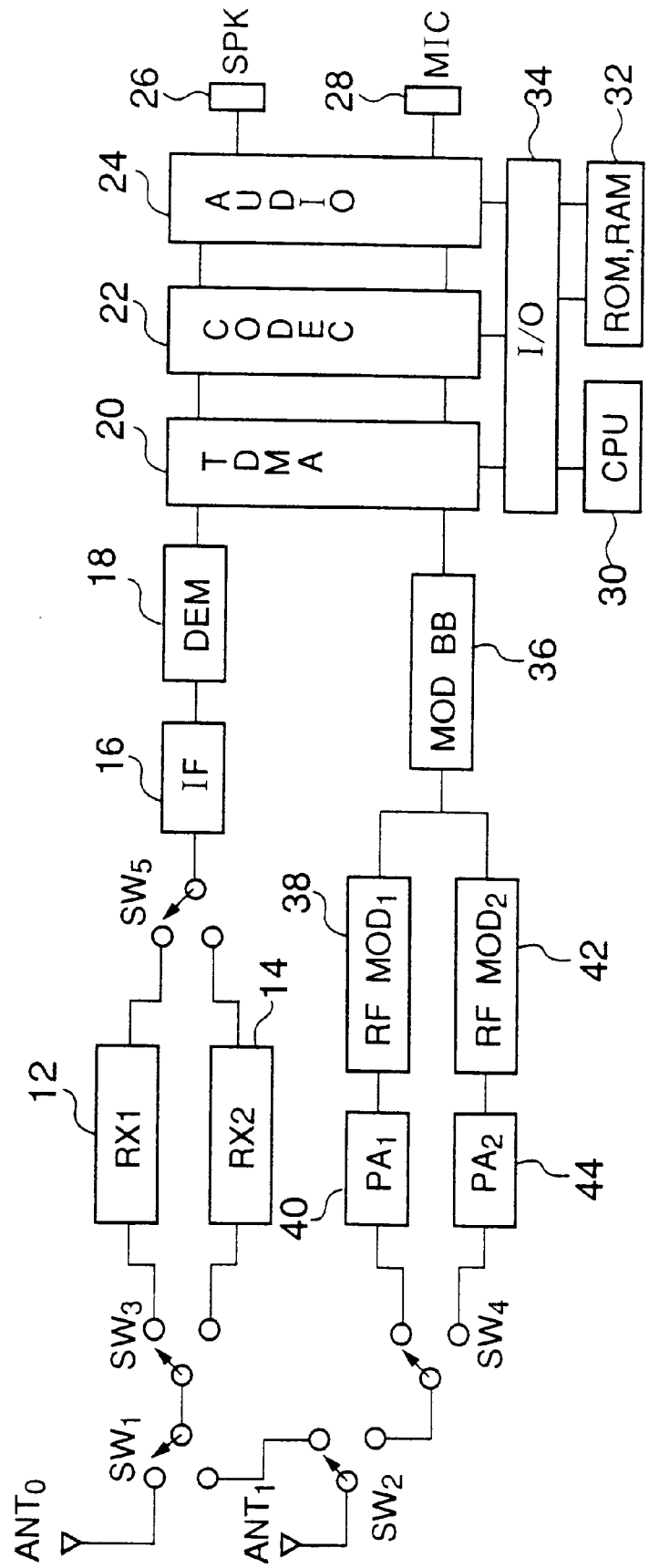
FIG. 2 is a block diagram of a basic configuration of a conventional digital portable telephone device.
Figure 3:
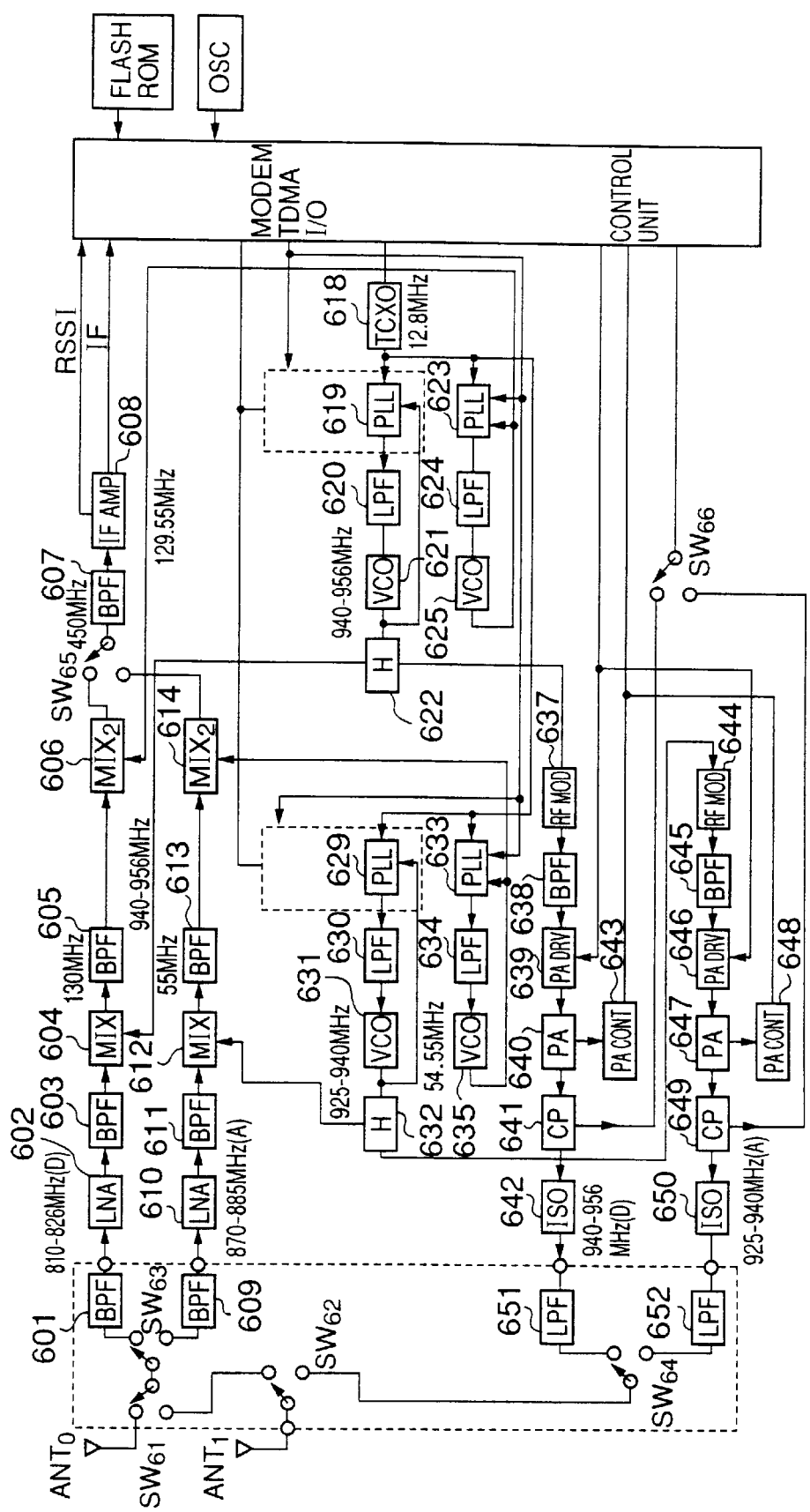
FIG. 3 is a circuit diagram showing a detailed structure of the conventional digital portable telephone device.
Figure 4:
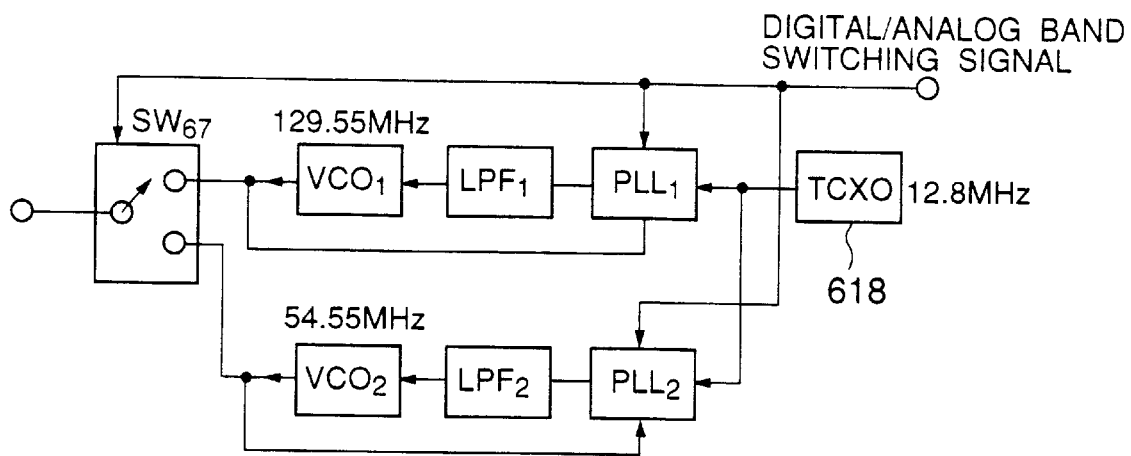
FIG. 4 is a diagram of a local signal generating section in the conventional digital portable telephone device.
Figure 5:
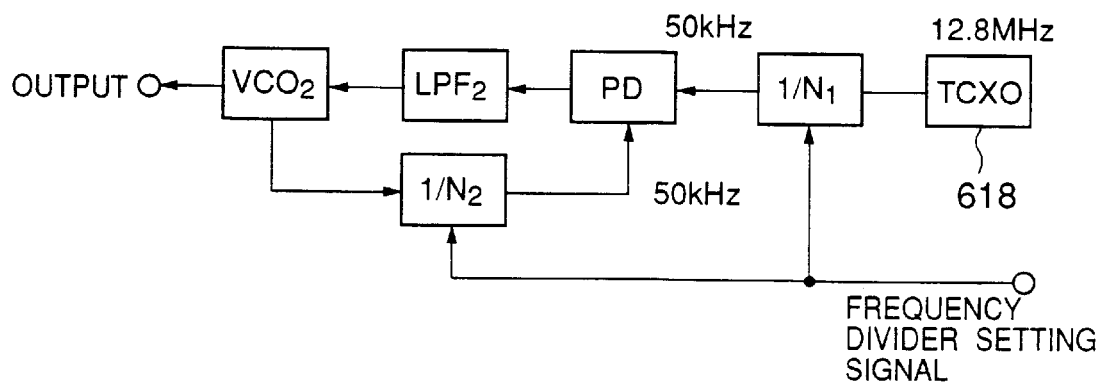
FIG. 5 is a diagram of a phase-locked loop in the local signal generating section of FIG. 4.

In the following description, the elements which are the same as corresponding elements in the previously-described conventional device of FIG. 3 are designated by the same reference numerals, and a duplicate description thereof will be omitted.

Figure 7A:
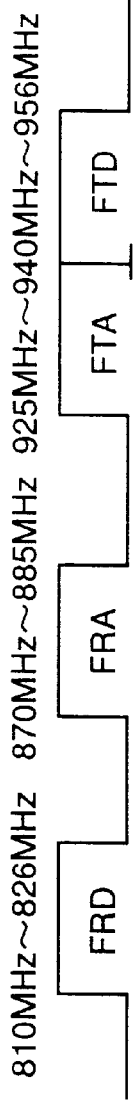
FIG. 7A through FIG. 7D are diagrams for explaining another local frequency selection method used by the present invention.

FIG. 6A through FIG. 6C show a local frequency selection method used by the present invention. FIG. 7A through FIG. 7D show another local frequency selection method used by the present invention. FIG. 6A and FIG. 7A show the analog and digital receiving/transmitting frequency bands used by the existing digital portable telephone devices.

In FIG. 6A through FIG. 7D, "FRD" denotes the digital receiving frequencies (810 MHz–826 MHz), "FRA" denotes the analog receiving frequencies (870 MHz–885 MHz), "FTA" denotes the analog transmitting frequencies (925 MHz–940 MHz), "FTD" denote the digital transmitting frequencies (940 MHz–956 MHz), "FRLA" denotes the analog local signal frequencies for the receiver section, "FRLD" denotes the digital local signal frequencies for the receiver section, "FTLA" denotes the analog local signal frequencies for the transmitter section, and "FTLD" denotes the digital local signal for the transmitter section.

First, a description will be given of a local frequency selection method used by the present invention with reference to FIG. 6A through FIG. 6C.

In the previously-described conventional device, the signal at the input of the first mixer 612 is converted into a first intermediate-frequency signal (55 MHz) by using a first local signal (which is within the FRLA indicated in FIG. 6B) from the analog-band local signal generating section. The first intermediate-frequency signal at the input of the second mixer 614 is converted into a second intermediate-frequency signal (450 kHz) by using the second local signal (54.55 MHz) from the analog-band local signal generating section.

In the previously-described conventional device, the signal at the input of the first mixer 604 is converted into a first intermediate-frequency signal (130 MHz) by using a first local signal (which is within the FRLD indicated in FIG. 6C) from the digital-band local signal generating section. The first intermediate-frequency signal at the input of the second mixer 606 is converted into a second intermediate-frequency signal (450 kHz) by using the second local signal (129.55 MHz) from the digital-band local signal generating section.

In order to provide a simple configuration for a digital portable telephone device, the local frequency selection method used by a digital portable telephone device of the present invention is as follows:

(1-1) The analog local signal frequencies (FRLA) of 925 MHz–940 MHz and the digital local signal frequencies (FRLD) of 940 MHz–956 MHz are combined and a broad local signal frequency band (925 MHz–956 MHz) including both the FRLA and the FRLD is created. A radio-frequency local signal generating section which supplies a first local signal within the broad band to both the receiver section and the transmitter section is provided in the digital portable telephone device of the present invention.

(1-2) When the above local signal generating section is provided as in the above item (1-1), a radio-frequency signal within the frequency band of 810 MHz –885 MHz is input to the receiver section. A low-noise amplifier and a first mixer which are a double-tuning type are provided for broad-band characteristics for the radio-frequency receiver section. The digital-band radio-frequency receiver section and the analog-band radio-frequency receiver section, as in the previously-described conventional device, are combined into a single section.

(1-3) The first intermediate-frequency signal at the output of the first mixer in the above item (1-2) has to be at 130 MHz for the digital band or at 55 MHz for the analog band. A combined band-pass filter unit, such as that having two surface acoustic wave (SAW) filters combined, which outputs a selected first intermediate-frequency signal (130 MHz or 55 MHz) to the second mixer, is provided.

(1-4) A radio-frequency local signal generating section which supplies a switched second local signal (129.55 MHz or 54.55 MHz), derived from a single voltage-controlled oscillator (VCO), to the second mixer in the receiver section, is provided. The digital-band local signal generating section and the analog-band local signal generating section, as in the previously-described conventional device, are combined into a single section.

Next, a description will be given of another local frequency selection method used by the present invention with reference to FIG. 7A through FIG. 7D.

Figure 7B:
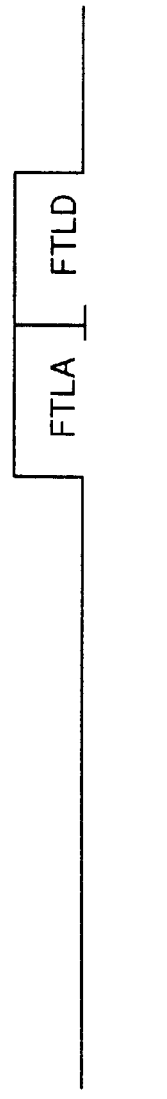
Figure 7C:
Figure 7D:
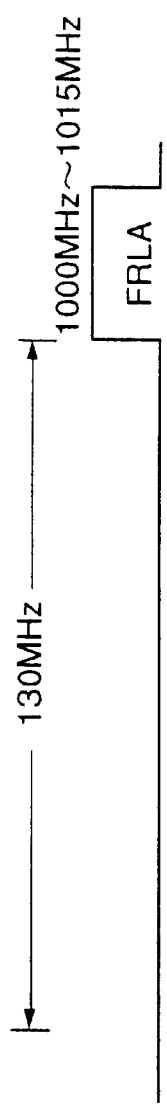

As shown in FIG. 7B through FIG. 7D, according to this local frequency selection method, the analog local signal frequencies for the transmitter section (FTLA) are set at the analog transmitting frequencies (FTA) of 925 MHz–940 MHz. The digital local signal frequencies for the transmitter section (FTLD) are set at the digital transmitting frequencies (FTD) of 940 MHz–956 MHz as shown in FIG. 7B. The digital local signal frequencies for the receiver section (FRLD) are set at the digital transmitting frequencies (FTD) of 940 MHz –956 MHz as shown in FIG. 7C. The analog local signal frequencies for the receiver section (FRLA) are set at a separate frequency band of 1000 MHz–1015 MHz as shown in FIG. 7D.

The difference between the digital receiving frequencies (FRD) and the digital local signal frequencies for the receiver section (FRLD) is 130 MHz. The difference between the analog receiving frequencies (FRA) and the analog local signal frequencies for the receiver section (FRLA) is 130 MHz. The first intermediate-frequency signal at the output of the first mixer in the receiver section can be set at 130 MHz which is common for both the analog receiving frequency band and the digital receiving frequency band.

In the above-mentioned local frequency selection, the following two procedures can be used to produce frequencies of the first and second local signals:

(2-1) The frequencies of the first and second local signals are directly produced from oscillation frequencies of voltage-controlled oscillators (VC0).

$$FTA=FTLA \qquad (1)$$

$$FTD=FTLD \qquad (2)$$

$$FRA=FRLA-IFR1 \qquad (3)$$

$$FRD=FRLD-IFR1 \qquad (4)$$

where IFR1 denotes the first intermediate frequency (130 MHz) for the receiver section. When the above procedure (2-1) is used, the first intermediate frequency (IFR1) is common for both the analog receiving frequency band and the digital receiving frequency band. If the first intermediate frequency (IFR1) with respect to the analog band is 130 MHz and the analog receiving frequencies (FRA) are 870 MHz–885 MHz, then the analog local signal frequencies for the receiver section (FRLA) are set at the frequency band of 1000 MHz–1015 MHz in accordance with the above formula (3).

(2-2) The frequencies of the first and second local signals are produced from oscillation frequencies of voltage-controlled oscillators (VC0) by using a heterodyne method.

$$FTA=FL1A+FRL2 \qquad (5)$$

$$FTD=FL1D+FRL2 \qquad (6)$$

$$FRA=(FL1A+FL2)-IFR1 \qquad (7)$$

$$FRD=(FL1D+FRL2)-IFR1 \qquad (8)$$

where FL1A denotes the first local signal frequency band for the receiver and transmitter sections related to the analog band, FL1D denotes the first local signal frequency band for the receiver and transmitter sections related to the digital band, FRL2 denotes the second local signal frequency band for the receiver section, FL2 denotes the second local signal frequency band for the receiver and transmitter sections, and IFR1 denotes the first intermediate frequency (130 MHz) for the receiver section. If the first intermediate frequency (IFR1) with respect to the analog band is 130 MHz, then the FRL2, the FL1 and the FL2 are produced in accordance with the above formulas (5) through (8) as follows.

$$FRL2 = 130\,\text{MHz} - 0.45\,\text{MHz} = 129.55\,\text{MHz}$$

$$\begin{aligned} FL1 &= FL1A + FL1D = (795.45\,\text{MHz to } 810\,\text{MHz}) \\ &\quad \text{to } (810\,\text{MHz to } 826.45\,\text{MHz}) \\ &= 795.45\,\text{MHz} - 826.45\,\text{MHz} \end{aligned}$$

$$\begin{aligned} FL2 &= (FRA + 130\,\text{MHz}) - FL1A = (1000\,\text{MHz to } 795.45\,\text{MHz}) \\ &\quad \text{to } (1015\,\text{MHz to } 810.45\,\text{MHz}) \\ &= 204.55\,\text{MHz} \end{aligned}$$

When the above procedure (2-2) is used, a variable range of oscillation frequencies of a first VCO in the local signal generating section is about 31 MHz, an oscillation frequency of a second VC0 is fixed at 129.55 MHz, and an oscillation frequency of a third VCO is fixed at 204.55 MHz.

When the FTLA and the FTLD are produced by the local signal generating section, the frequency band of 925 MHz–956 MHz is obtained by using a heterodyne method for the FL1 and the FRL2. When the FRLA is produced by the local signal generating section, the frequency band of 1000 MHz–1031 MHz is obtained by using a heterodyne method for the FL1 and the FL2. By using a band-pass filter, this frequency band may be changed to a frequency band of 1000 MHz–1015 MHz.

Figure 8:
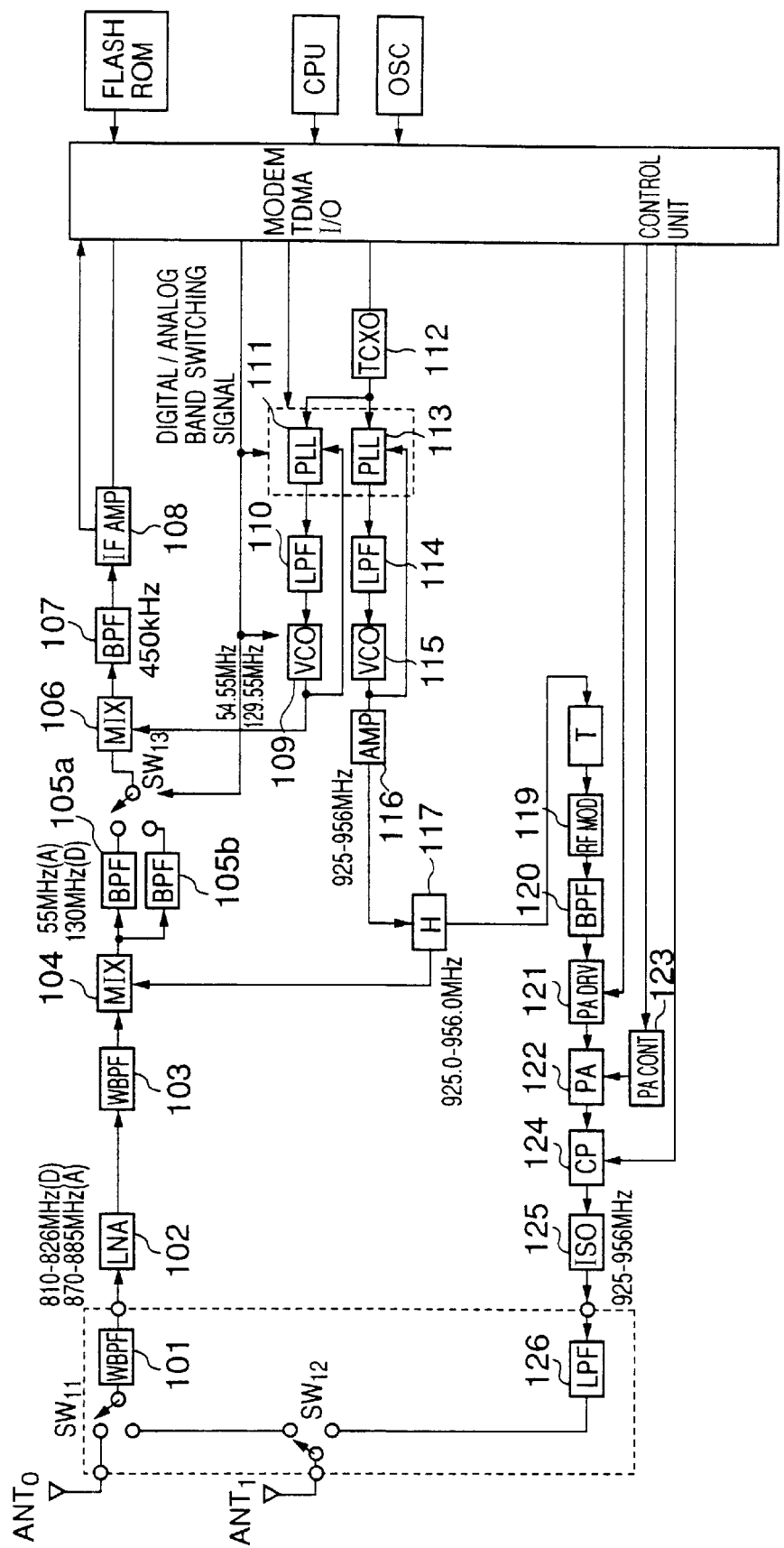
FIG. 8 is a block diagram of a first embodiment of a digital portable telephone device of the present invention.

Next, FIG. 8 shows a first embodiment of a digital portable telephone device of the present invention. In the present embodiment, the local frequency selection method of FIG. 6B and FIG. 6C is used.

As shown in FIG. 8, the digital portable telephone device of the present embodiment includes a receiver section which comprises a wideband-pass filter (WBPF) 101, a low-noise amplifier (LNA) 102, a wideband-pass filter (WBPF) 103, and a first mixer (MIX) 104. The receiver section has broad-band receiving characteristics to cover both the analog receiving frequency band and the digital receiving frequency band (810 MHz–885 MHz) while requiring only a single structure of the filters, the amplifier and the mixer.

The digital portable telephone device of the present embodiment includes a transmitter section which has broad-band modulation and amplification characteristics to cover both the analog transmitting frequency band and the digital transmitting frequency band (925 MHz–956 MHz) while requiring only a single structure.

The digital portable telephone device of the present embodiment includes a radio-frequency local signal generating section which comprises a phase-locked loop (PLL) 113, a low-pass filter (LPF) 114, and a voltage-controlled oscillator (VCO) 115. A reference oscillator (TCX0) 112 is connected to the PLL 113. The VCO 115 is connected to an amplifier (AMP) 116, and the AMP 116 is connected to a hybrid (H) unit 117. The radio-frequency local signal generating section generates a first local signal (925 MHz–956 MHz) at an output of the VCO 115 by using an output signal of the reference oscillator 112. The first local signal is within either one of the analog local signal frequencies for the receiver section (FRLA) and the digital local signal frequencies for the receiver section (FRLD), and it is supplied from the hybrid unit 117 to both the first mixer 104 in the receiver section and a radio-frequency modulator (RF MOD) 119 in the transmitter section.

In the previously-described conventional device of FIG. 3, the digital-band local signal generating section supplies the digital-band first local signal (940 MHz–956 MHz) to either the first mixer 604 in the digital-band receiver section or the RF MOD unit 637 in the digital-band transmitter section, and the analog-band local signal generating section supplies the analog-band first local signal (925 MHz–940 MHz) to either the first mixer 612 in the analog-band receiver section or the RF MOD unit 644 in the analog-band transmitter section.

In contrast, in the digital portable telephone device of the present embodiment, the radio-frequency local signal generating section supplies the first local signal (925 MHz–956 MHz) to both the first mixer 104 in the receiver section and the RF MOD 119 in the transmitter section. Therefore, the radio-frequency local signal generating section of the present embodiment requires only a single structure of the PLL, the LPF and the VCO to achieve the same functions as the digital-band local signal generating section and the analog-band local signal generating section in the previously-described conventional device.

As shown in FIG. 8, the radio-frequency local signal generating section in the present embodiment further comprises a phase-locked loop (PLL) 111, a low-pass filter (LPF) 110, and a voltage-controlled oscillator (VCO) 109. The reference oscillator 112 is connected to the PLL 111. The VCO 109 is connected to a second mixer (MIX) 106 in the receiver section. These elements of the radio-frequency local signal generating section generate a switched second local signal (129.55 MHz or 54.55 MHz) by using the output signal of the reference oscillator 112, which will be described later. The switched second local signal is supplied from the VCO 109 to the second mixer 106 in the receiver section.

In the previously-described conventional device, the digital-band local signal generating section supplies the digital-band second local signal (129.55 MHz) to the second mixer 606 in the digital-band receiver section, and the analog-band local signal generating section supplies the analog-band second local signal (54.55 MHz) to the second mixer 614 in the analog-band receiver section.

In contrast, in the digital portable telephone device of the present embodiment, the radio-frequency local signal generating section supplies the switched second local signal (129.55 MHz or 54.55 MHz) to the second mixer 106 in the receiver section. Therefore, the radio-frequency local signal generating section of the present embodiment requires only a single structure of the PLL, the LPF and the VCO to achieve the same functions as the digital-band local signal generating section and the analog-band local signal generating section in the previously-described conventional device.

Further, the low-noise amplifier 102 and the first mixer 104 in this embodiment are a double-tuning type, and provide broad-band characteristics for the radio-frequency receiver section. The radio-frequency signal at the input of the first mixer 104 is converted into one of a digital-band first intermediate-frequency signal (130 MHz) and an analog-band first intermediate-frequency signal (55 MHz) by using the first local signal from the radio-frequency local signal generating section. A method of selecting one of the digital-band first intermediate-frequency signal and the analog-band first intermediate-frequency signal according to the present invention will be described later.

The digital-band local signal generating section supplies also the switched second local signal (129.55 MHz or 54.55 MHz) to the second mixer 106 in the receiver section. The first intermediate-frequency signal at the second mixer 106 is converted into a second intermediate-frequency signal (450 kHz) by using the second local signal. The second intermediate-frequency signal is delivered to an intermediate-frequency amplifier (IF AMP) 108 via a band-pass filter (BPF) 107. The amplified intermediate-frequency signal (450 kHz) from the IF AMP 108 is sent to the control unit.

As the first local signal (925 MHZ–956 MHz) from the radio-frequency local signal generating section is sent to the RF MOD 119 in the transmitter section, the RF MOD 119 generates a π/4-shifted QPSK modulation signal by using the first local signal, and the modulation signal is passed through a band-pass filter (BPF) 120, a driver circuit (PA DRV) 121, a power amplifier (PA) 122, a coupler (CP) 124, an isolator (ISO) 125, and a low-pass filter (LPF) 126 in this order. The amplified signal passed through the LPF 126 is supplied to the transmitting antenna ANT1 via a switch SW12, and it is transmitted from the transmitting antenna ANT1. Control of transmission power related to the transmitter section is carried out by the driver circuit 121, the power amplifier 122, the coupler 124, a power amplifier controller (PA CONT) 123, and the control unit.

The receiver section of the digital portable telephone device of the present embodiment further includes a switch (SW13), a combined band-pass filter unit, the second mixer (MIX) 106, the band-pass filter 107, and the intermediate-frequency amplifier (IF AMP) 108.

The combined band-pass filter unit in the present embodiment is a single package in which a first surface acoustic wave (SAW) filter 105a for passing a 130-MHz digital-band signal and a second surface acoustic wave (SAW) filter 105b for passing a 55-MHz analog-band signal are provided. The switch SW13 is provided to select one of an output of the first SAW filter 105a and an output of the second SAW filter 105b. A digital/analog band switching signal is externally supplied to the switch SW13. The switch SW13 is actuated in response to the digital/analog band switching signal, so as to select one of an output signal (130 MHz) of the first SAW filter 105a and an output signal (55 MHz) of the second SAW filter 105b. Therefore, the combined band-pass filter unit outputs a selected first intermediate-frequency signal (130 MHz or 55 MHz) to the second mixer 106 in synchronism with the output of the reference oscillator 112.

Figure 9:
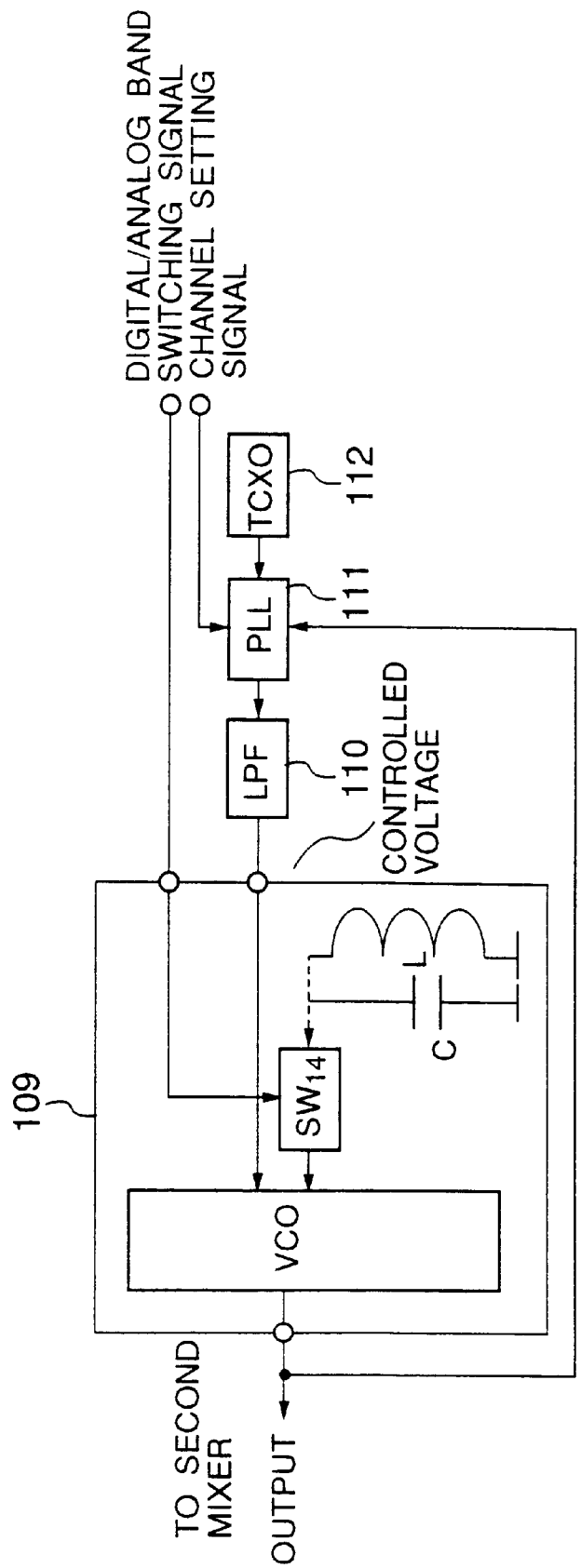
FIG. 9 is a diagram of a local signal generating section in the digital portable telephone device.

FIG. 9 shows the radio-frequency local signal generating section in the digital portable telephone device of the present embodiment. As described above, the radio-frequency local signal generating section in the present embodiment generates a switched second local signal (129.55 MHz or 54.55 MHz) from the output signal of the reference oscillator 112 while requiring only a single structure of the PLL, the LPF and the VCO.

As shown in FIG. 9, the radio-frequency local signal generating section comprises the reference oscillator (TCX0) 112, the phase-locked loop (PLL) 111, the low-pass filter (LPF) 110, and the voltage-controlled oscillator (VCO) 109. The VCO 109 in this embodiment comprises a switch (SW14), a capacitor (C), and an inductance coil (L).

For example, when a digital/analog band switching signal is externally supplied to the VCO 109, the switch SW14 is turned OFF in response to the supplied signal. The capacitor C and the inductance coil L are disconnected from a resonance circuit in the VCO 109 due to an OFF state of the switch SW14. At this time, a resonance frequency of the VCO 109 is shifted from 54.55 MHz to 129.55 MHz. The radio-frequency local signal generating section generates a second local signal (129.55 MHz) by using the output signal of the reference oscillator 112.

On the other hand, when no digital/analog band switching signal is externally supplied to the VCO 109, the switch SW14 remains in an ON state. The capacitor C and the inductance coil L are connected to the resonance circuit in the VCO 109 through the switch SW14. The resonance frequency of the VCO 109 at this time is set at 54.55 MHz. The radio-frequency local signal generating section generates a second local signal (54.55 MHz) by using the output signal of the reference oscillator 112.

Accordingly, the radio-frequency local signal generating section in the present embodiment generates a switched second local signal (129.55 MHz or 54.55 MHz) from the output signal of the reference oscillator 112 while requiring only a single structure of the PLL, the LPF and the VCO.

Figure 10:
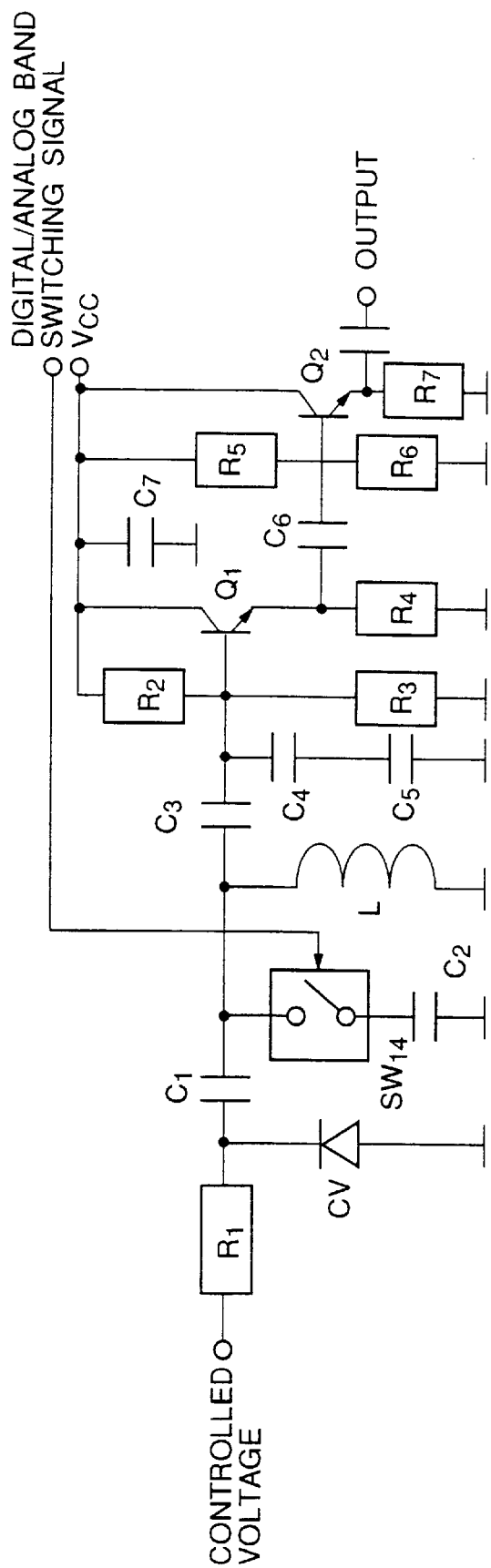
FIG. 10 is a circuit diagram of a voltage-controlled oscillator in the local signal generating section of FIG. 9.

FIG. 10 shows the voltage-controlled oscillator (VCO) in the local signal generating section of FIG. 9. In FIG. 10, "VCC" indicates a source voltage supplied to the VCO.

As shown in FIG. 10, a resonance circuit of the voltage-controlled oscillator (VCO) comprises a variable-capacitance diode (CV), a plurality of capacitors (C1 through C5), and an inductance coil (L). These elements of the resonance circuit are connected as shown in FIG. 10. The VCO includes the switch SW14, a plurality of resistors (R1 through R7), two capacitors C6 and C7, and two transistors Q1 and Q2. These elements of the VCO are connected as shown in FIG. 10.

A resonance frequency of the resonance circuit in the VCO primarily depends on a combined capacitance of the variable-capacitance diode CV and the capacitors C2, C4 and C5 and an inductance of the inductance coil L.

When the switch SW14 is ON, the capacitor C2 is connected to the resonance circuit in the VCO through the switch SW14. The resonance frequency of the resonance circuit in the VCO at this time is lowered to 54.55 MHz by an additional capacitance of the capacitor C2. The VCO outputs a second local signal (54.55 MHz) to the second mixer 106 in the receiver section of the digital portable telephone device.

When the switch SW14 is turned OFF by the digital/analog band switching signal supplied thereto. The capacitor C2 is disconnected from the resonance circuit in the VCO due to the OFF state of the switch SW14. At this time, the resonance frequency of the resonance circuit in the VCO is raised from 54.55 MHz to 129.55 MHz. The VCO outputs a second local signal (129.55 MHz) to the second mixer 106 in the receiver section of the digital portable telephone device.

Accordingly, the local signal generating section in the present embodiment supplies a switched second local signal (129.55 MHz or 54.55 MHz) to the receiver section while requiring only a single structure of the PLL, the LPF and the VCO.

In the above-described embodiment of FIG. 8, the receiver section comprises the wideband-pass filter (WBPF) 101, the low-noise amplifier (LNA) 102, the wideband-pass filter (WBPF) 103, and the first mixer (MIX) 104. The LNA 102 and the first mixer 104 are the double-tuning type in order to provide broad-band characteristics.

Figure 11:
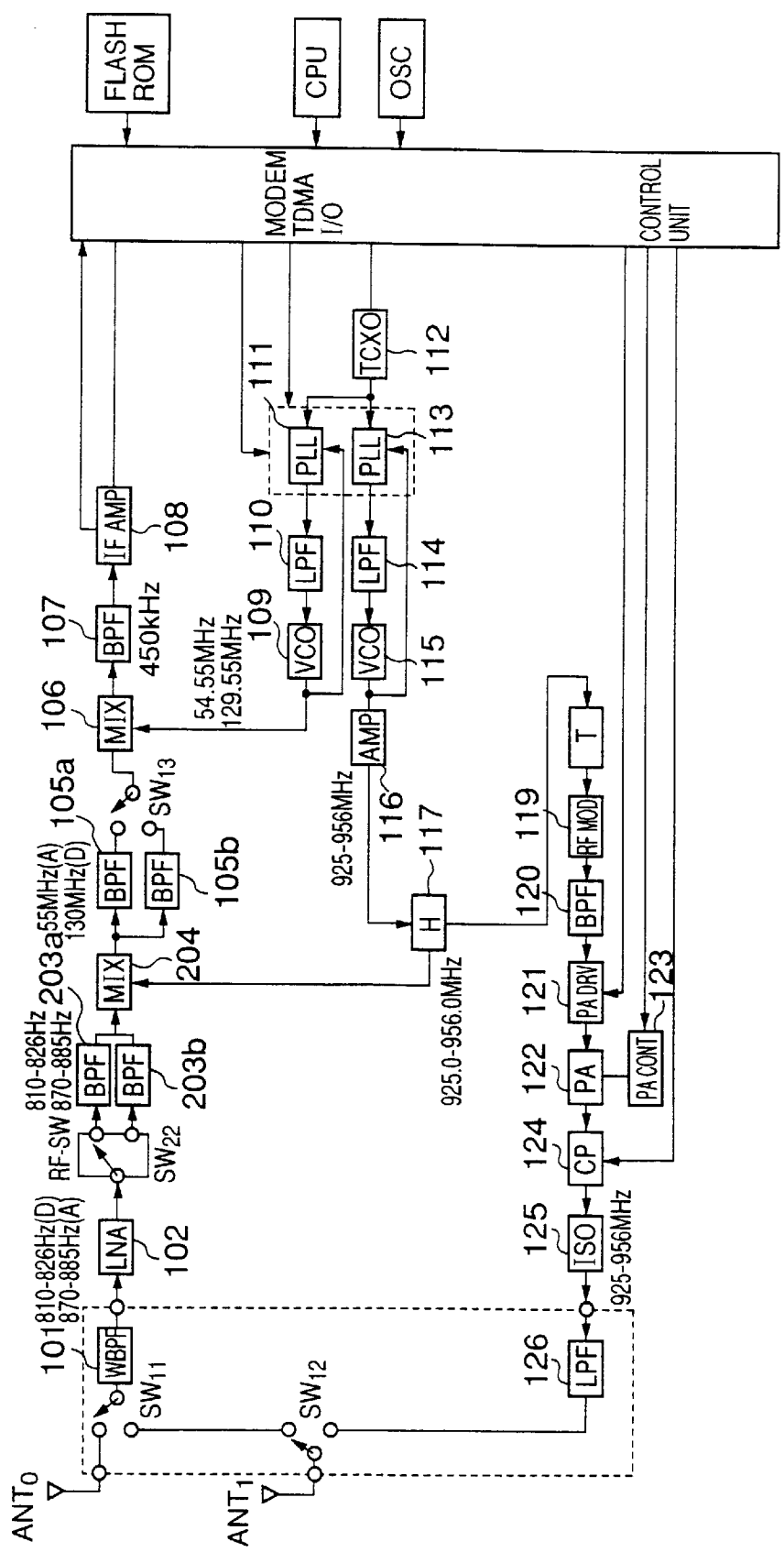
FIG. 11 is a block diagram of a modification of the digital portable telephone device of FIG. 8.

In a case in which it is difficult to provide the double-tuning first mixer 104, the receiver section in the above-described embodiment of FIG. 8 may be modified, with no need for providing the double-tuning first mixer 104, as shown in FIG. 11.

FIG. 11 shows such a modification of the digital portable telephone device of FIG. 8. In FIG. 11, the elements which are the same as corresponding elements in FIG. 8 are designated by the same reference numerals, and a duplicate description thereof will be omitted.

As shown in FIG. 11, the receiver section of the present embodiment comprises a first mixer (MIX) 204, a combined band-pass filter unit provided at the input of the first mixer 204, and a switch (SW22) provided between the LNA 102 and the combined band-pass filter. Other elements in the present embodiment are the same as corresponding elements in the first embodiment of FIG. 8.

In the combined band-pass filter unit in the present embodiment, a first band-pass filter (BPF) 203a for passing a signal within a frequency band of 810 MHz–826 MHz and a second band-pass filter (BPF) 203b for passing a signal within a frequency band of 870 MHz–885 MHz are provided. The switch SW22 is provided to connect the LNA 102 to one of an input of the first BPF 203a and an input of the second BPF 203b. The digital/analog band switching signal (not shown in FIG. 11) is externally supplied to the switch SW22. The switch SW22 is actuated in response to the digital/analog band switching signal, so as to deliver the signal from the LNA 102 to a selected one of the input of the first BPF 203a and the input of the second BPF 203b. Therefore, the combined band-pass filter unit outputs a selected one of the signal within the frequency band of 810 MHz–826 MHz and the signal within the frequency band of 870 MHz–885 MHz to the first mixer 204.

Similar to the above-described embodiment of FIG. 8, the radio-frequency local signal generating section supplies the first local signal (925 MHz–956 MHz) to the first mixer 204. In the first mixer 204, the radio-frequency signal at the input of the first mixer 204 is converted into one of the digital-band first intermediate-frequency signal (130 MHz) and the analog-band first intermediate-frequency signal (55 MHz) by using the first local signal from the radio-frequency local signal generating section.

Further, similar to the above-described embodiment of FIG. 8, the switch SW13 is actuated in response to the digital/analog band switching signal (not shown in FIG. 11), so as to select one of the output signal (130 MHz) of the first SAW filter 105*a* and the output signal (55 MHz) of the second SAW filter 105*b*. The combined band-pass filter unit (105*a*, 105*b*) outputs a selected first intermediate-frequency signal (130 MHz or 55 MHz) to the second mixer 106 in synchronism with the output of the reference oscillator 112. The first intermediate-frequency signal from the combined band-pass filter unit is passed through the second mixer 106, the BPF 107 and the IF AMP 108, and the resulting signal from the IF AMP 108 is sent to the control unit.

In the above-described embodiment of FIG. 11, the combined band-pass filter unit (203*a*, 203*b*) is provided at the input of the first mixer 204, and it is possible to prevent attenuation due to image frequencies from being decreased.

Figure 12:
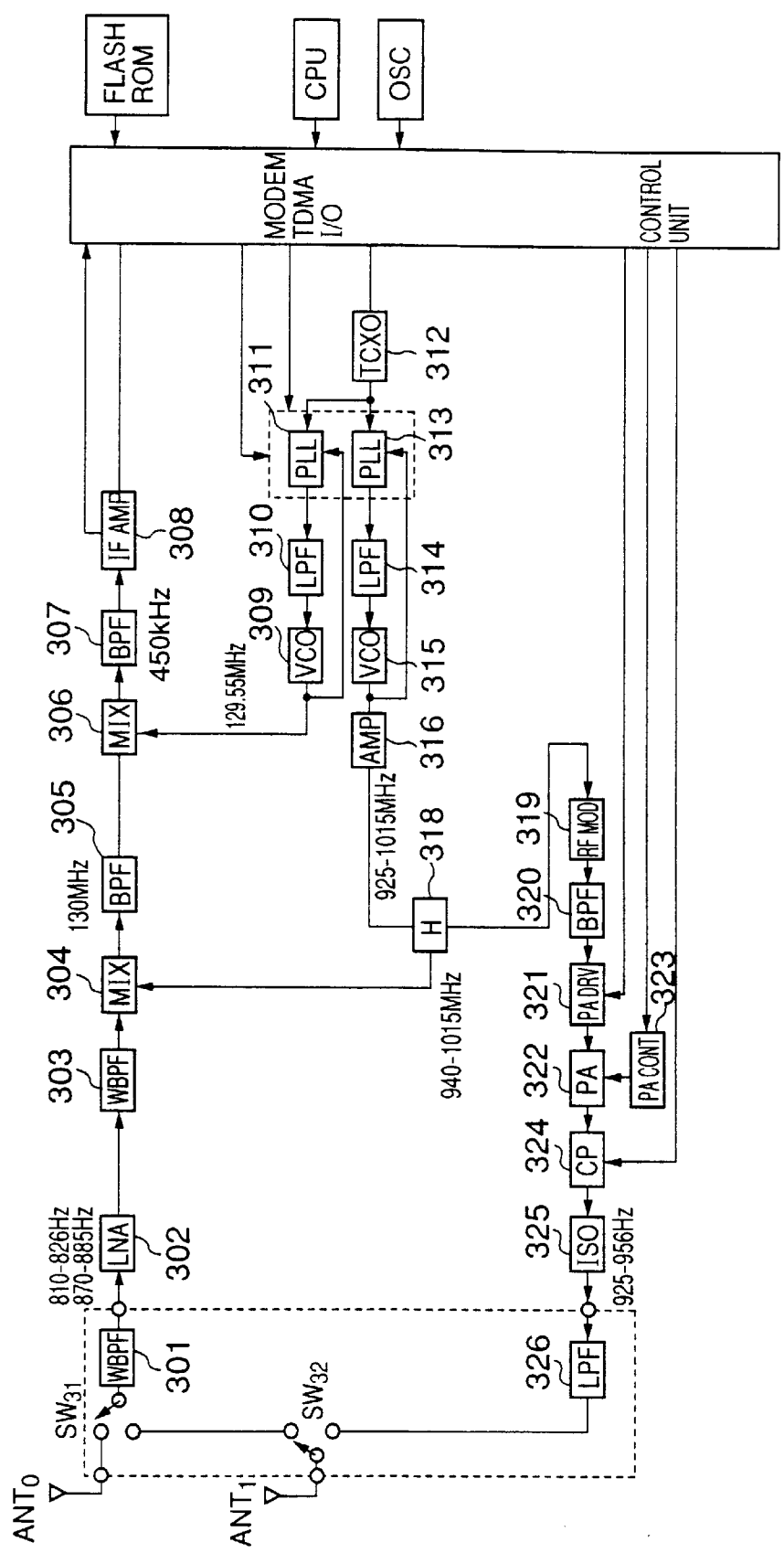
FIG. 12 is a block diagram of a second embodiment of the digital portable telephone device of the present invention.

FIG. 12 shows a second embodiment of the digital portable telephone device of the present invention. In the present embodiment, the local frequency selection method (2-1) of FIG. 7A through FIG. 7D is used.

A radio-frequency local signal generating section in the present embodiment generates; a local signal within either one of the FTLA, the FTLD, the FRLD and the FRLA, and the entire frequency band of the local signal is 925 MHz–1015 MHz. As shown in FIG. 7B through FIG. 7D, the analog and digital local signal frequencies for the transmitter section are in the range of 925 MHz–956 MHz, and the analog and digital local signal frequencies for the receiver section are in the range of 940 MHz–1015 MHz.

As shown in FIG. 12, the receiver section of the digital portable telephone device of the present embodiment comprises a wideband-pass filter (WBPF) 301, a low-noise amplifier (LNA) 302, a wideband-pass filter (WBPF) 303, and a first mixer (MIX) 304. The receiver section has broad-band receiving characteristics to cover both the analog receiving frequency band and the digital receiving frequency band (or 810 MHz–885 MHz) while requiring only a single structure of the filters, the amplifier and the mixer.

The transmitter section of the digital portable telephone device of the present embodiment has broad-band modulation and amplification characteristics to cover both the analog transmitting frequency band and the digital transmitting frequency band (or 925 MHz–956 MHz) while requiring only a single structure.

The radio-frequency local signal generating section in the present embodiment comprises a phase-locked loop (PLL) 313, a low-pass filter (LPF) 314, and a voltage-controlled oscillator (VCO) 315. A reference oscillator (TCX0) 312 is connected to the PLL 313. The VCO 315 is connected to an amplifier (AMP) 316, and the AMP 316 is connected to a hybrid (H) unit 318. As described above, the radio-frequency local signal generating section generates a first local signal (925 MHz–1015 MHz) at an output of the VCO 315 by using an output signal of the reference oscillator 312. This first local signal is supplied from the hybrid unit 318 to both the first mixer 304 in the receiver section and a radio-frequency modulator (RF MOD) 319 in the transmitter section.

In the digital portable telephone device of the present embodiment, the radio-frequency local signal generating section supplies the first local signal (925 MHz–1015 MHz) to both the first mixer 304 in the receiver section and the RF MOD 319 in the transmitter section. Therefore, the radio-frequency local signal generating section of the present embodiment requires only a single structure of the PLL, the LPF and the VCO to achieve the same functions as the digital-band local signal generating section and the analog-band local signal generating section in the previously-described conventional device.

As shown in FIG. 12, the radio-frequency local signal generating section in the present embodiment further comprises a phase-locked loop (PLL) 311, a low-pass filter (LPF) 310, and a voltage-controlled oscillator (VCO) 309. The reference oscillator 312 is connected to the PLL 311. The VCO 309 is connected to a second mixer (MIX) 306 in the receiver section. These elements of the radio-frequency local signal generating section generate a fixed second local signal (129.55 MHz) from the output signal of the reference oscillator 312. The fixed second local signal is supplied from the VCO 309 to the second mixer 306 in the receiver section.

In the digital portable telephone device of the present embodiment, the radio-frequency local signal generating section supplies the fixed second local signal (129.55 MHz) to the second mixer 306 in the receiver section. Therefore, the radio-frequency local signal generating section of the present embodiment requires only a single structure of the PLL, the LPF and the VCO to achieve the same functions as the digital-band local signal generating section and the analog-band local signal generating section in the previously-described conventional device.

Further, the low-noise amplifier 302 and the first mixer 304 in this embodiment are a double-tuning type, and provide broad-band characteristics for the radio-frequency receiver section. The radio-frequency signal at the input of the first mixer 304 is converted into the common first intermediate-frequency signal (130 MHz) by using the first local signal from the radio-frequency local signal generating section. The first intermediate-frequency signal from the first mixer 304 is sent to the second mixer 306 through a band-pass filter (BPF) 305.

The radio-frequency local signal generating section supplies the second local signal (129.55 MHz) to the second mixer 306 in the receiver section. The first intermediate-frequency signal at the second mixer 306 is converted into a second intermediate-frequency signal (450 kHz) by using the second local signal. The second intermediate-frequency signal is delivered to an intermediate-frequency amplifier (IF AMP) 308 via a band-pass filter (BPF) 307. The amplified intermediate-frequency signal (450 kHz) from the IF AMP 308 is sent; to the control unit.

As the first local signal (925 MHZ–956 MHz) from the radio-frequency local signal generating section is sent to the RF MOD 319 in the transmitter section, the RF MOD 319 generates a π/4-shifted QPSK modulation signal by using the first local signal, and the modulation signal is passed through a band-pass filter (BPF) 320, a driver circuit (PA DRV) 321, a power amplifier (PA) 322, a coupler (CP) 324, an isolator (ISO) 325, and a low-pass filter (LPF) 326 in this order. The amplified signal passed through the LPF 326 is supplied to the transmitting antenna ANT1 via the switch SW32, and it is transmitted from the transmitting antenna ANT1. Control of transmission power related to the transmitter section is carried out by the driver circuit 321, the power amplifier 322, the coupler 324 a power amplifier controller (PA CONT) 323, and the control unit.

As the first local signal (940 MHZ–1015 MHz) from the radio-frequency local signal generating section is sent to the first mixer 304 in the receiver section, the radio-frequency signal at the input of the first mixer 304 is converted into into the common first intermediate-frequency signal (130 MHz) by using the first local signal. This first intermediate-frequency signal is delivered to the second mixer 306 via the BPF 305.

The radio-frequency local signal generating section supplies the second local signal (129.55 MHz) to the second mixer 306 in the receiver section. The first intermediate-frequency signal at the input of the second mixer 306 is converted into the second intermediate-frequency signal (450 kHz) by using the second local signal. The second intermediate-frequency signal is delivered to the IF AMP 308 via the BPF 307. The amplified intermediate-frequency signal (450 kHz) from the IF AMP 308 is sent to the control unit.

In the present embodiment, the first intermediate-frequency signal is common for both the analog frequency band and the digital frequency band, and it is not necessary to provide the switch SW13 at the input of the second mixer 306 as in the first embodiment of FIG. 8.

In the local signal generating section of the present embodiment, a transmitting condition in which an analog-band local signal within the transmitter analog local signal frequencies FTLA (925 MHz–940 MHz) is generated can be switched at a high speed to a receiving condition in which an analog-band local signal within the receiver analog local signal frequencies FRLA (1000 MHz–1015 MHz) is generated. It is not necessary for the local signal generating section of the present embodiment to switch from the receiving condition to the transmitting condition at high speed.

Figure 13:
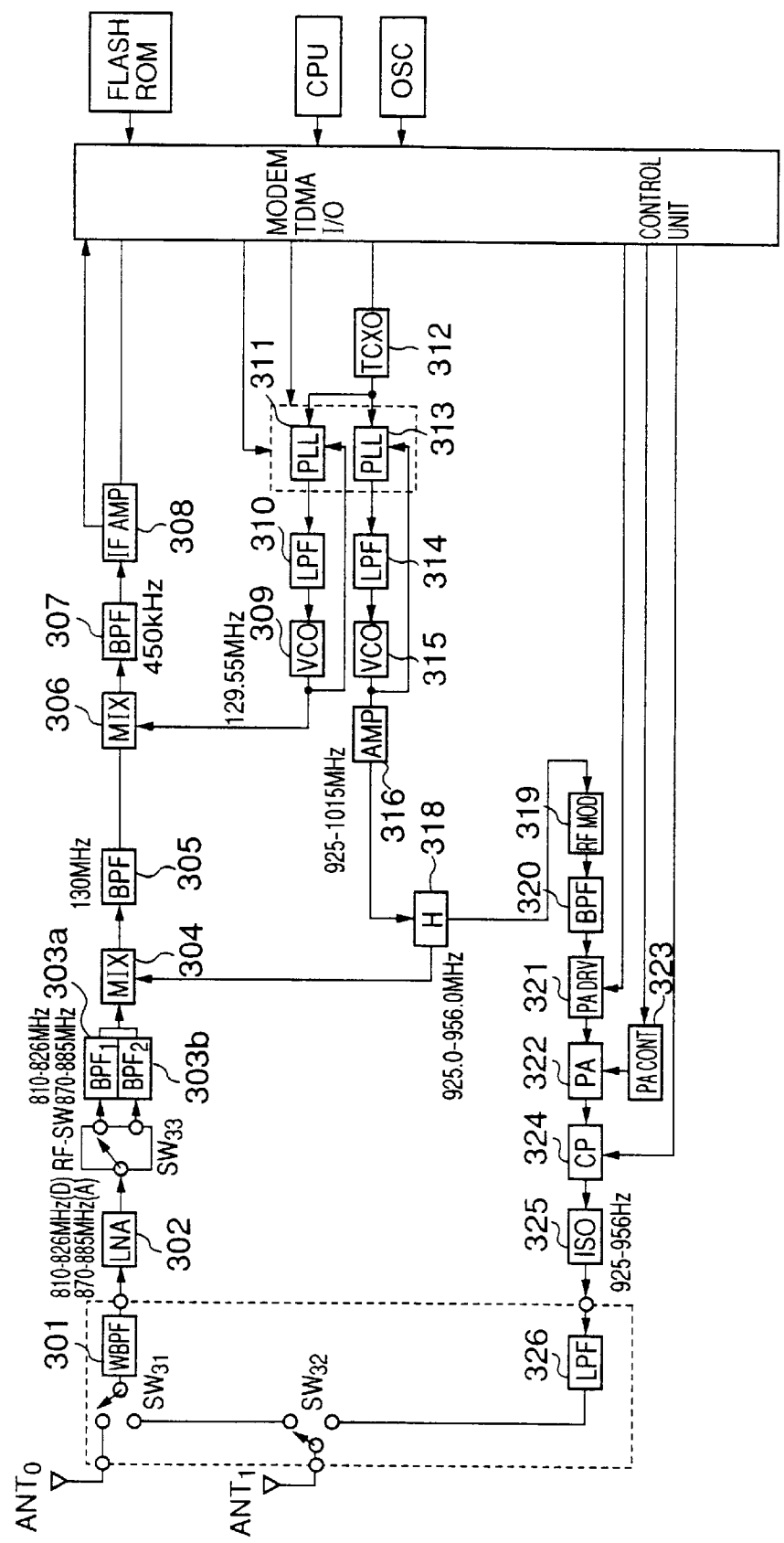
FIG. 13 is a block diagram of a modification of the digital portable telephone device of FIG.12.

In a case in which it is difficult to provide the double-tuning first mixer 304, the receiver section in the above-described embodiment of FIG. 12 may be modified, with no need for providing the double-tuning first mixer 304, as shown in FIG. 13.

FIG. 13 shows such a modification of the digital portable telephone device of FIG. 12. In FIG. 13, the elements which are the same as corresponding elements in FIG. 12 are designated by the same reference numerals, and a duplicate description thereof will be omitted.

As shown in FIG. 13, the receiver section of the present embodiment comprises the first mixer (MIX) 304 (not the double-tuning type), a combined band-pass filter unit provided at the input of the first mixer 304, and a switch (SW33) provided between the LNA 302 and the combined band-pass filter. Other elements in the present embodiment are the same as corresponding elements in the second embodiment of FIG. 12.

In the combined band-pass filter unit in the present embodiment, a first band-pass filter (BPF) 303a for passing a signal within a frequency band of 810 MHz–826 MHz and a second band-pass filter (BPF) 303b for passing a signal within a frequency band of 870 MHz–885 MHz are provided. The switch SW33 is provided to connect the LNA 302 to one of an input of the first BPF 303a and an input of the second BPF 303b. The digital/analog band switching signal (not shown in FIG. 13) is externally supplied to the switch SW33. The switch SW33 is actuated in response to the digital/analog band switching signal, so as to deliver the signal from the LNA 302 to a selected one of the input of the first BPF 303a and the input of the second BPF 303b. Therefore, the combined band-pass filter unit outputs a selected one of the signal within the frequency band of 810 MHz–826 MHz and the signal within the frequency band of 870 MHz–885 MHz to the first mixer 304.

Except for the switch SW33, the combined band-pass filter unit (303a, 303b) and the first mixer 304, the operation of the digital portable telephone device of the present embodiment of FIG. 13 is essentially the same as the operation of the second embodiment of FIG. 12.

In the present embodiment of FIG. 13, the combined band-pass filter unit (303a, 303b) is provided at the input of the first mixer 304, and it is possible to prevent the attenuation due to image frequencies from being decreased. In addition, in the local signal generating section of the present embodiment, a transmitting condition in which an analog-band local signal within the FTLA (925 MHz–940 MHz) is generated is switched at a high speed to a receiving condition in which an analog-band local signal within the FRLA (1000 MHz–1015 MHz) is generated.

Figure 14:
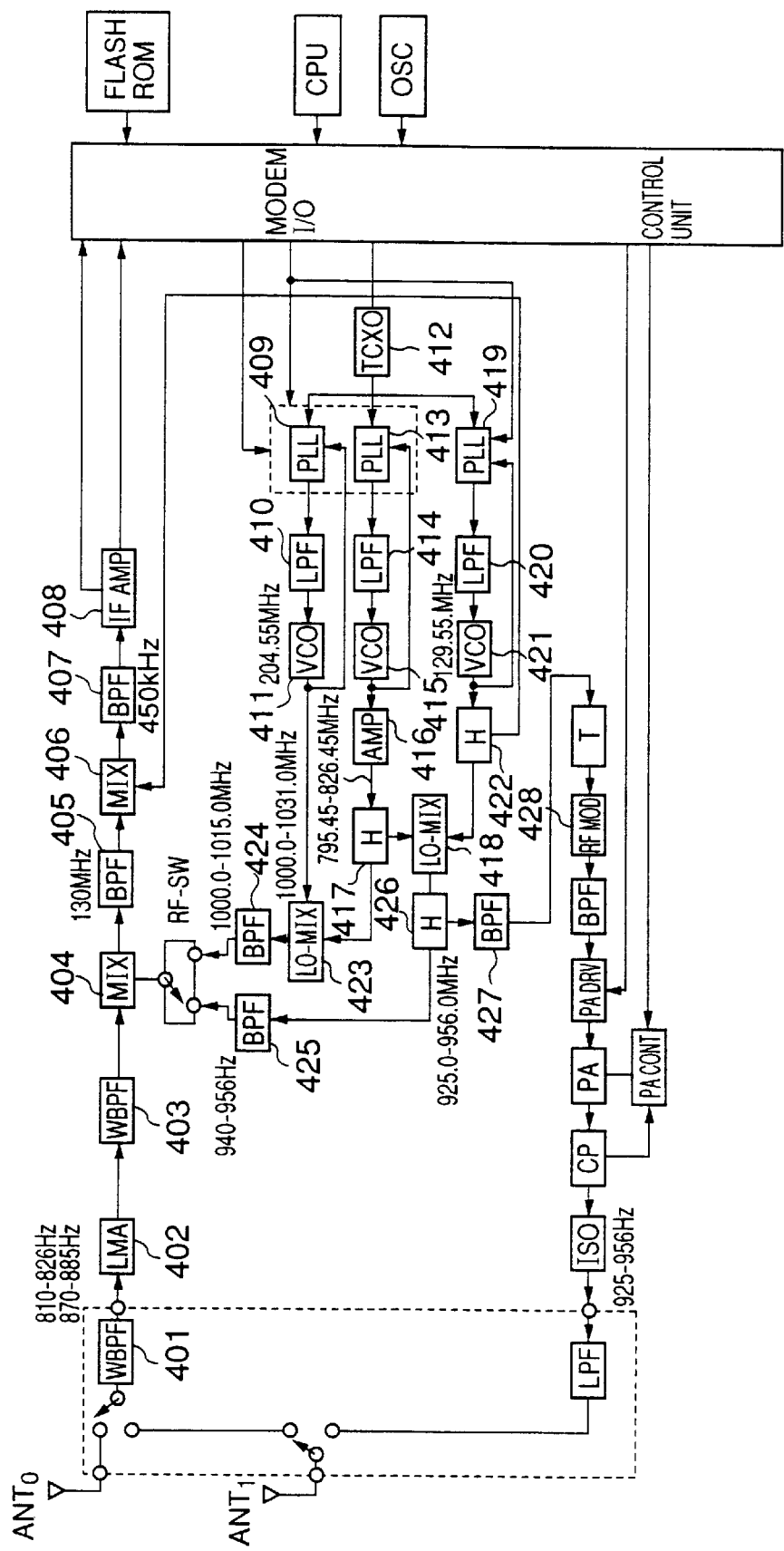
FIG. 14 is a block diagram of a third embodiment of the digital portable telephone device of the present invention.

Next, FIG. 14 shows a third embodiment of the digital portable telephone device of the present invention. In the present embodiment, the local frequency selection method (2-2) of FIG. 7A through FIG. 7D is used.

As described above, when the local frequency selection method (2-2) of FIG. 7A through FIG. 7D is used, the receiver second local signal frequency band FRL2, the receiver/transmitter first local signal frequency band FL1, and the receiver/transmitter second local signal frequency band FL2 are produced by using the heterodyne method in accordance with the above formulas (5) through (8) as follows.

$FRL2 = 129.55$ MHz $FL1 = 795.45$ MHz–$826.45$ MHz $FL2 = 204.55$ MHz

As shown in FIG. 14, a radio-frequency local signal generating section in the present embodiment comprises a phase-locked loop (PLL) 409, a low-pass filter (LPF) 410 and a voltage-controlled oscillator (VCO) 411. A reference oscillator (TCX0) 412 is connected to the PLL 409. These elements of the radio-frequency local signal generating section generate a local signal at the fixed frequency (204.55 MHz) of the receiver/transmitter second local signal frequency band FL2.

The radio-frequency local signal generating section in the present embodiment further comprises a phase-locked loop (PLL) 413, a low-pass filter (LPF) 414 and a voltage-controlled oscillator (VCO) 415. The reference oscillator 412 is connected to the PLL 413. These elements of the radio-frequency local signal generating section generate a local signal within the receiver/transmitter first local signal frequency band FL1 (795.45 MHz–826.45 MHz). The VCO 415 is connected to an amplifier (AMP) 416, and the AMP 416 is connected to a hybrid (H) unit 417.

The radio-frequency local signal generating section in the present embodiment further comprises a phase-locked loop (PLL) 419, a low-pass filter (LPF) 420 and a voltage-controlled oscillator (VCO) 421. The reference oscillator 412 is connected to the PLL 419. These elements of the radio-frequency local signal generating section generate a local signal at the fixed frequency (129.55 MHz) of the receiver/transmitter first local signal frequency band FL1. The VCO 421 is connected to a hybrid (H) unit 422.

The hybrid unit 422 is connected to a local mixer (LO-MIX) 418. The LO-MIX 418 is connected to both the hybrid unit 417 and a hybrid (H) unit 426. The hybrid unit 417 is connected to a local mixer (LO-MIX) 423. In addition, the VCO 411 is connected to the LO-MIX 423. The LO-MIX 423 is connected to a radio-frequency switch (RF-SW) via a band-pass filter (BPF) 424. The switch RF-SW is connected to a first mixer (MIX) 404 in the receiver section.

The local signal within the fixed frequency (129.55 MHz) from the VCO 421 and the local signal within the receiver/transmitter first local signal frequency band FL1 (795.45 MHz–826.45 MHz) from the VCO 415 are mixed by the LO-MIX 418 and a local signal within the frequency band of 925.0 MHz–956.0 MHz is produced at the output of the LO-MIX 418. The local signal from the LO-MIX 418 is distributed to either one of the receiver section and the transmitter section by the hybrid unit 426.

In addition, the hybrid unit 422 is connected to a second mixer (MIX) 406 in the receiver section. The local signal within the fixed frequency (129.55 MHz) from the VCO 421 is delivered from the hybrid unit 422 to the second mixer 406 in the receiver section.

The local signal within the fixed frequency (204.55 MHz) from the VCO 411 and the local signal within the receiver/transmitter first local signal frequency band FL1 (795.45 MHz–826.45 MHz) from the VCO 415 are mixed by the LO-MIX 423, and a local signal within the frequency band of 1000.0 MHz–1031.0 MHz is produced at the output of the LO-MIX 423. By using the BPF 424, the local signal from the LO-MIX 423 is limited to a local signal within the frequency band of 1000.0 MHz–1015.0 MHz. The local signal from the BPF 424 is delivered to the first mixer 404 in the receiver section via the switch RF-SW.

The hybrid unit 426 is connected to the switch RF-SW via a band-pass filter (BPF) 425. The BPF 424 passes a signal within the frequency band of 1000.0 MHz–1015.00 MHz, and the BPF 425 passes a signal within the frequency band of 940 MHz–956 MHz. The hybrid unit 426 is also connected to a radio-frequency modulator (RF MOD) 428 in the transmitter section via a band-pass filter (BPF) 427. The BPF 427 passes a switch within the frequency band of 925.0 MHz–956.0 MHz. Therefore, the local signal from the LO-MIX 418 is delivered from the hybrid unit 426 to the RF MOD 428 in the transmitter section through the BPF 427, and it is also delivered from the hybrid unit 426 to the first mixer 404 in the receiver section through the BPF 425 and the switch RF-SW.

As shown in FIG. 14, the receiver section of the digital portable telephone device of the present embodiment comprises a wideband-pass filter (WBPF) 401, a low-noise amplifier (LNA) 402, a wideband-pass filter (WBPF) 403, and the first mixer (MIX) 404. The receiver section has broad-band receiving characteristics to cover both the analog receiving frequency band and the digital receiving frequency band (or 810 MHz–885 MHz) while requiring only a single structure of the filters, the amplifier and the first mixer.

The transmitter section of the digital portable telephone device of the present embodiment has broad-band modulation and amplification characteristics to cover both the analog transmitting frequency band and the digital transmitting frequency band (or 925 MHz–956 MHz) while requiring only a single structure. As shown in FIG. 14, the elements in the transmitter section of the present embodiment are the same as corresponding elements in the transmitter section of the digital portable telephone device of FIG. 8 unless otherwise specified.

The digital/analog band switching signal (not shown in FIG. 14) is externally supplied to the switch RF-SW at the output of the radio-frequency local signal generating section. Therefore, switch RF-SW in the present embodiment is actuated in response to the digital/analog band switching signal. By using the digital/analog band switching signal, it is possible to easily switch between the analog local signal frequency band and the digital local signal frequency band.

In the digital portable telephone device of FIG. 14, the radio-frequency local signal generating section supplies the first local signal (925 MHz–1015 MHz) to both the first mixer 404 in the receiver section and the RF MOD 428 in the transmitter section. Therefore, the radio-frequency local signal generating section of the present embodiment requires only a simple configuration in order to achieve the same functions as the digital-band local signal generating section and the analog-band local signal generating section in the previously-described conventional device.

In the digital portable telephone device of the present embodiment, the radio-frequency local signal generating section supplies the fixed second local signal (129.55 MHz) to the second mixer 406 in the receiver section. Therefore, the radio-frequency local signal generating section of the present embodiment requires only a simple configuration in order to achieve the same functions as the digital-band local signal generating section and the analog-band local signal generating section in the previously-described conventional device.

Further, the low-noise amplifier 402 and the first mixer 404 provide broad-band characteristics for the radio-frequency receiver section. The radio-frequency signal at the input of the first mixer 404 is converted into the common first intermediate-frequency signal (130 MHz) by using the first local signal from the radio-frequency local signal generating section. The first intermediate-frequency signal from the first mixer 404 is sent to the second mixer 406 through a band-pass filter (BPF) 405.

The radio-frequency local signal generating section supplies the second local signal (129.55 MHz) to the second mixer 406 in the receiver section. The first intermediate-frequency signal at the input of the second mixer 406 is converted into a second intermediate-frequency signal (450 kHz) by using the second local signal. The second intermediate-frequency signal is delivered to an intermediate-frequency amplifier (IF AMP) 408 via a band-pass filter (BPF) 407. The amplified intermediate-frequency signal (450 kHz) from the IF AMP 408 is sent to the control unit.

As the first local signal (925 MHZ–956 MHz) from the radio-frequency local signal generating section is sent to the RF MOD 428 in the transmitter section via the BPF 427, the RF MOD 428 generates a π/4-shifted QPSK modulation signal by using the first local signal, and this modulation signal is passed through a band-pass filter (BPF), a driver circuit (PA DRV), a power amplifier (PA), a coupler (CP), an isolator (ISO), and a low-pass filter (LPF) in this order. The amplified radio-frequency signal is supplied to the transmitting antenna ANT1, and it is transmitted from the transmitting antenna ANT1.

As the first local signal (940 MHZ–1015 MHz) from the radio-frequency local signal generating section is sent to the first mixer 404 in the receiver section, the radio-frequency signal at the input of the first mixer 404 is converted into the common first intermediate-frequency signal (130 MHz) by using the first local signal. This first intermediate-frequency signal is delivered to the second mixer 306 via the BPF 305.

The radio-frequency local signal generating section supplies the second local signal (129.55 MHz) to the second mixer 406 in the receiver section. The first intermediate-frequency signal at the input of the second mixer 406 is converted into the second intermediate-frequency signal (450 kHz) by using the second local signal. The second intermediate-frequency signal is delivered to the IF AMP 408 via the BPF 407. The amplified intermediate-frequency signal (450 kHz) from the IF AMP 408 is sent to the control unit.

The digital receiving frequencies are 810 MHz–826 MHz, and the radio-frequency local signal generating section (the elements 409–411) in the present embodiment may possibly receive an undesired signal at 818.2 MHz which is approximately four times the fixed frequency (204.55 MHz) at the output of the VCO 411. In order to avoid this problem, when receiving a signal within the digital receiving band (FRD), the elements 409–411 of the radio-frequency local signal generating section in the present embodiment stops operation. Thus, at this time, the local signal at the fixed frequency (204.55 MHz) is not produced at the output of the VCO 411, and it is possible to prevent the radio-frequency local signal generating section from receiving the undesired signal.

In the present embodiment, the first intermediate-frequency signal is common for both the analog frequency band and the digital frequency band, and it is not necessary to provide the switch SW13 at the input of the second mixer 406 as in the first embodiment of FIG. 8.

In the present embodiment, the radio-frequency local signal generating section includes the VCO0 415, the VCO 421 and the VCO 411, and the variable range of oscillation frequencies of the VCO 415 is about 31 MHz, the oscillation frequency of the VCO 421 is fixed at 129.55 MHz, and the oscillation frequency of the VCO 411 is fixed at 204.55 MHz. It is possible to easily construct the digital portable telephone device of the present embodiment at low cost, and at the same time the digital portable telephone device of the present embodiment can achieve the same functions as the previously-described conventional device.

Figure 15:
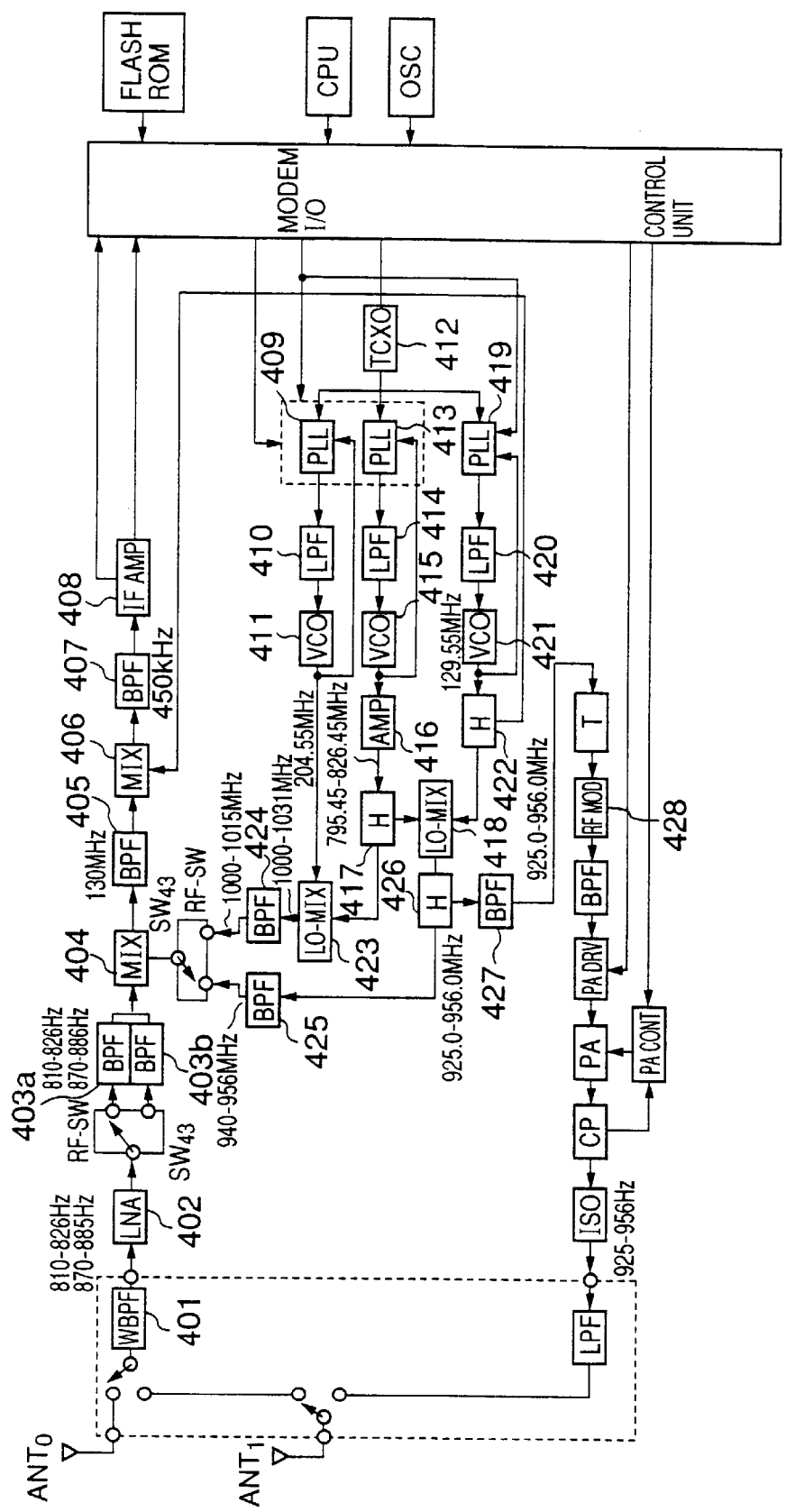
FIG. 15 is a block diagram of a modification of the digital portable telephone device of FIG.14.

FIG. 15 shows a modification of the digital portable telephone device of FIG.14. In FIG. 15, the elements which are the same as corresponding elements in FIG. 14 are designated by the same reference numerals unless otherwise specified, and a description thereof will be omitted.

When it is necessary to eliminate image frequencies to a sufficient level, the receiver section (especially the WBPF 403) of the digital portable telephone device of the embodiment of FIG.14 is modified as shown in FIG. 15.

The receiver section of the digital portable telephone device in the present embodiment comprises a combined band-pass filter unit (403a, 403b) provided at the input of the first mixer 404 and a switch (SW43) provided between the LNA 402 and the combined band-pass filter. Other elements in the present embodiment are the same as corresponding elements in the second embodiment of FIG. 14.

When it is not necessary to eliminate image frequencies to a sufficient level, the wideband-pass filter (WBPF) 403 may be used in the receiver section of the digital portable telephone device as shown in FIG. 14. Alternatively, a double-tuning first mixer 404 may be used in the receiver section of the digital portable telephone device in FIG. 14.

Further, the present invention is not limited to the above-described embodiments, and variations and modifications may be made without departing from the scope of the present invention.

What is claimed is:

1. A digital portable telephone device in which frequency-division multiple access is carried out by using a signal within one of an analog frequency band and a digital frequency band, comprising:

a receiver section for receiving a signal within one of an analog receiving frequency band and a digital receiving frequency band, wherein a received signal is converted into one of a digital-band first intermediate-frequency signal and an analog-band first intermediate-frequency signal by using a first local signal;

a transmitter section for transmitting a signal within one of an analog transmitting frequency band and a digital transmitting frequency band, wherein a modulation signal is generated by using the first local signal; and a radio-frequency local signal generating section for generating the first local signal within one of a digital local signal frequency band and an analog local signal frequency band, and for supplying the first local signal to one of the receiver section and the transmitter section;

wherein said receiver section requires only a single second mixer and a single second intermediate-frequency filter for down-conversion of the received signal frequency into one of the digital-band intermediate frequency and the analog-band intermediate frequency, said second mixer converting a selected one of the digital-band first intermediate-frequency signal and the analog-band first intermediate-frequency signal into a second intermediate-frequency signal by using a second local signal.

2. The device according to claim 1, wherein said receiver section includes a single first mixer, said first mixer converting the received signal into one of the digital-band first intermediate-frequency signal and the analog-band first intermediate-frequency signal by using the first local signal from the radio-frequency local signal generating section.

3. The device according to claim 1, wherein said transmitter section includes a single radio-frequency modulator, said modulator generating the modulation signal by using the first local signal from the radio-frequency local signal generating section.

4. The device according to claim 1, wherein said radio-frequency local signal generating section comprises a voltage-controlled oscillator, said oscillator supplying the second local signal to the second mixer in the receiver section, said oscillator having a resonance frequency changeable between two predetermined frequency values in response to a digital/analog band switching signal.

5. A digital portable telephone device in which frequency-division multiple access is carried out by using a signal within one of an analog frequency band and a digital frequency band, comprising:

a receiver section for receiving a signal within one of an analog receiving frequency band and a digital receiving frequency band, wherein a received signal is converted into a first intermediate-frequency signal that is common for both the analog receiving frequency band the digital receiving frequency band, by using a first local signal;

a transmitter section for transmitting a signal within one of an analog transmitting frequency band and a digital transmitting frequency band, wherein a modulation signal is generated by using the first local signal; and a radio-frequency local signal generating section for generating the first local signal within one of a digital local signal frequency band and an analog local signal frequency band, and for supplying the first local signal to one of the receiver section and the transmitter section, wherein a frequency of the first local signal within each of the digital local signal frequency band and the analog local signal frequency band is directly produced from oscillation frequencies of less than three voltage-controlled oscillators;

wherein said radio-frequency local signal generating section is capable of quickly switching a transmitting condition in which an analog-band local signal within transmitter analog local signal frequencies is generated to a receiving condition in which an analog-band local signal within receiver analog local signal frequencies is generated, and wherein said receiver section requires only a single second mixer and a single second intermediate-frequency filter for down-conversion of the received signal frequency into one of the digital-band intermediate frequency and the analog-band intermediate frequency.

6. The device according to claim 5, wherein said receiver section includes a single first mixer.

7. The device according to claim 5, wherein said transmitter section includes a single radio-frequency modulator, said modulator generating the modulation signal by using the first local signal from the radio-frequency local signal generating section.

8. A digital portable telephone device in which frequency-division multiple access is carried out by using a signal within one of an analog frequency band and a digital frequency band, comprising:

a receiver section for receiving a signal within one of an analog receiving frequency band and a digital receiving frequency band, wherein a received signal is converted into a first intermediate-frequency signal that is common for both the analog receiving frequency band and the digital receiving frequency band, by using a first local signal;

a transmitter section for transmitting a signal within one of an analog transmitting frequency band and a digital transmitting frequency band, wherein a modulation signal is generated by using the first local signal; and a radio-frequency local signal generating section for generating the first local signal within one of a digital local signal frequency band and an analog local signal frequency band, and for supplying the first local signal to one of the receiver section and the transmitter section, wherein a frequency of the first local signal within each of the digital local signal frequency band and the analog local signal frequency band is produced from oscillation frequencies of less than four voltage-controlled oscillators by using a heterodyne method;

wherein said radio-frequency local signal generating section comprises:

first oscillator means for generating a local signal at a first fixed frequency;

second oscillator means for generating a local signal within a predetermined local signal frequency band;

third oscillator means for generating a local signal at a second fixed frequency;

first local mixer means for mixing the local signal from said first means and the local signal from said second means to produce a local signal within a receiver analog local signal frequency band; and second local mixer means for mixing the local signal from said second means and the local signal from said third means to produce a local signal within either one of a receiver digital local signal frequency band and a transmitter analog/digital local signal frequency band.

9. The device according to claim 8, wherein said second oscillator means stops generating the local signal within the predetermined local signal frequency band when the receiver section receives a signal within the digital receiving frequency band.

10. The device according to claim 8, wherein said transmitter section includes a single radio-frequency modulator, said modulator generating the modulation signal by using the first local signal from the radio-frequency local signal generating section.

11. A digital portable telephone device which uses a signal within one of a first frequency band and a second frequency band, comprising:

a receiver section for receiving a signal within one of said first frequency band and said second frequency band, wherein a received signal is converted into an intermediate-frequency signal that is common for both the first frequency band and the second intermediate-frequency band, by using a first local signal;

a transmitter section for transmitting a signal within one of a first transmitting frequency band and a second transmitting frequency band, wherein a modulation signal is generated by using the first local signal; and a radio-frequency local signal generating section for generating the first local signal within one of a first local signal frequency band and a second local signal frequency band, and for supplying the first local signal to one of the receiver section and the transmitter section, wherein said receiver section requires only a single second mixer and a single second intermediate-frequency filter for down-conversion of the received signal frequency into one of the digital-band intermediate frequency and the analog-band intermediate frequency, said mixer converting a selected one of the first intermediate-frequency signal and the second intermediate-frequency signal into an intermediate-frequency signal by using a second local signal.

12. A digital portable telephone device which uses a signal within one of a first frequency band and a second frequency band, comprising:

a receiver section for receiving a signal within one of said first frequency band and said second frequency band, wherein a received signal is converted into a first intermediate-frequency signal that is common for both said first frequency band and said second frequency band, by using a first local signal;

a transmitter section for transmitting a signal within one of a first transmitting frequency band and a second transmitting frequency band, wherein a modulation signal is generated by using the first local signal; and a radio-frequency local signal generating section for generating the first local signal within one of a first local signal frequency band and a second local signal frequency band, and for supplying the first local signal to one of the receiver section and the transmitter section, wherein a frequency of the first local signal within each of the first local signal frequency band and the second local signal frequency band is directly produced from oscillation frequencies of less than three voltage-controlled oscillators, wherein said radio-frequency local signal generating section is capable of quickly switching a transmitting condition in which a local signal within transmitter local signal frequencies is generated to a receiving condition in which a local signal within receiver local signal frequencies is generated, and wherein said receiver section requires only a single second mixer and a single second intermediate-frequency filter for down-conversion of the received signal frequency into one of the digital-band intermediate frequency and the analog-band intermediate frequency.

13. A digital portable telephone device which uses a signal within one of a first frequency band and a second frequency band, comprising:

a receiver section for receiving a signal within one of said first frequency band and said second frequency band, wherein a received signal is converted into a first intermediate-frequency signal that is common for both said first frequency band and said second frequency band, by using a first local signal;

a transmitter section for transmitting a signal within one of a first transmitting frequency band and a second transmitting frequency band, wherein a modulation signal is generated by using the first local signal; and a radio-frequency local signal generating section for generating the first local signal within one of a first local signal frequency band and a second local signal frequency band, and for supplying the first local signal to one of the receiver section and the transmitter section, wherein a frequency of the first local signal within each of the first local signal frequency band and the second local signal frequency band is produced from oscillation frequencies of less than four voltage-controlled oscillators by using a heterodyne method, wherein said radio-frequency local signal generating section comprises:

first oscillator means for generating a local signal at a first fixed frequency;

second oscillator means for generating a local signal within a predetermined local signal frequency band;

third oscillator means for generating a local signal at a second fixed frequency;

first local mixer mean s for mixing the local signal from said first oscillator means and the local signal from said second oscillator means to produce a local signal within a first receiver local signal frequency band; and second local mixer means for mixing the local signal from said second oscillator means and the local signal from said third oscillator means to produce a local signal within either one of a second receiver local signal frequency band and a transmitter local signal frequency band.

* * * * *